(12) United States Patent
Kurokawa et al.

(10) Patent No.: US 8,140,045 B2
(45) Date of Patent: Mar. 20, 2012

(54) SEMICONDUCTOR DEVICE

(75) Inventors: Yoshiyuki Kurokawa, Sagamihara (JP); Takayuki Ikeda, Atsugi (JP); Masami Endo, Atsugi (JP); Hiroki Dembo, Isehara (JP); Daisuke Kawae, Isehara (JP); Takayuki Inoue, Atsugi (JP); Munehiro Kozuma, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 875 days.

(21) Appl. No.: 12/003,697

(22) Filed: Dec. 31, 2007

(65) Prior Publication Data

US 2008/0165023 A1    Jul. 10, 2008

(30) Foreign Application Priority Data

Jan. 6, 2007    (JP) ................................. 2007-000858

(51) Int. Cl.
*H04B 1/28* (2006.01)
(52) U.S. Cl. .......... 455/333; 455/91; 455/130; 455/142; 455/164.2; 342/118; 342/451; 340/572.1
(58) Field of Classification Search .................. 455/333, 455/91, 130, 142, 164.2; 340/572.1; 342/118, 342/451
See application file for complete search history.

(56) References Cited

U.S. PATENT DOCUMENTS

| | | | |
|---|---|---|---|
| 5,339,040 A * | 8/1994 | Loper | 329/358 |
| 5,418,358 A * | 5/1995 | Bruhnke et al. | 235/492 |
| 5,873,041 A | 2/1999 | Ishii | |
| 6,243,034 B1 * | 6/2001 | Regier | 341/166 |
| 7,228,114 B2 * | 6/2007 | Chao et al. | 455/115.1 |
| 7,420,497 B2 * | 9/2008 | Chiu | 341/155 |
| 2002/0016172 A1 | 2/2002 | Kangras et al. | |
| 2003/0121985 A1 * | 7/2003 | Baldischweiler et al. | 235/492 |
| 2004/0140931 A1 | 7/2004 | Vesuna | |
| 2004/0145454 A1 | 7/2004 | Powell et al. | |
| 2005/0190098 A1 | 9/2005 | Bridgelall et al. | |
| 2006/0044147 A1 | 3/2006 | Knox et al. | |

(Continued)

FOREIGN PATENT DOCUMENTS

DE    10142951    4/2003

(Continued)

OTHER PUBLICATIONS

*Analog/Digital Conversion*, The Art of Electronics, second edition, 1989, pp. 621-629.

(Continued)

*Primary Examiner* — Sanh Phu
(74) *Attorney, Agent, or Firm* — Eric J. Robinson; Robinson Intellectual Property Law Office, P.C.

(57) ABSTRACT

A semiconductor device is provided with a power supply circuit having a function to generate a power supply voltage from a wireless signal and an A/D converter circuit having a function to detect the strength of the wireless signal by an A/D conversion of a voltage generated from the wireless signal. This enables to provide a semiconductor device which does not require replacement of batteries, has few limitations on its physical shape and mass, and has a function to detect a physical position. By formation of the semiconductor device with use of a thin film transistor formed over a plastic substrate, a lightweight semiconductor device, which has flexibility in physical shape and a function to detect a physical location, can be provided at low cost.

22 Claims, 20 Drawing Sheets

U.S. PATENT DOCUMENTS

| | | |
|---|---|---|
| 2006/0290484 A1 | 12/2006 | Bauchot et al. |
| 2007/0013517 A1* | 1/2007 | Posamentier ............... 340/572.1 |
| 2007/0046430 A1* | 3/2007 | Yamazaki et al. ........... 340/10.1 |
| 2007/0073513 A1* | 3/2007 | Posamentier ................. 702/150 |
| 2007/0075873 A1 | 4/2007 | Yang et al. |
| 2008/0182538 A1* | 7/2008 | Tanaka et al. .............. 455/234.1 |

FOREIGN PATENT DOCUMENTS

| | | |
|---|---|---|
| EP | 0 583 690 | 2/1994 |
| EP | 0713344 | 5/1996 |
| EP | 1437603 | 7/2004 |
| EP | 1 760 640 | 3/2007 |
| JP | 2000-149194 | 5/2000 |
| JP | 2002-098749 | 4/2002 |
| JP | 2002-259921 | 9/2002 |
| JP | 2005-092343 | 4/2005 |
| JP | 2005-316724 | 11/2005 |
| JP | 2006-503376 | 1/2006 |
| JP | 2007-043316 | 2/2007 |
| WO | WO-2004/036482 | 4/2004 |
| WO | WO 2007/008949 | 1/2007 |

OTHER PUBLICATIONS

Search Report (Application No. 08000119.1) dated May 27, 2008.

* cited by examiner

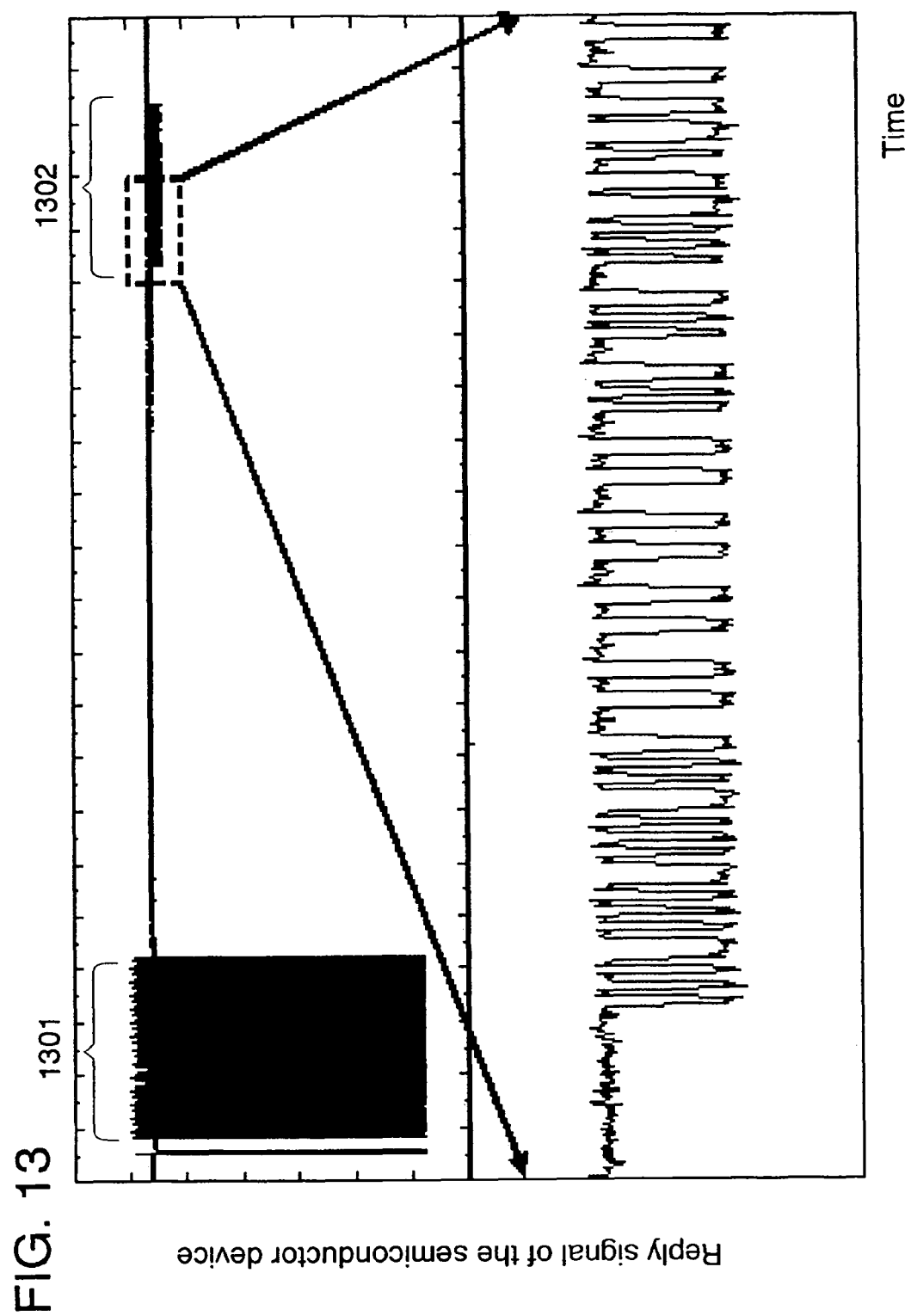

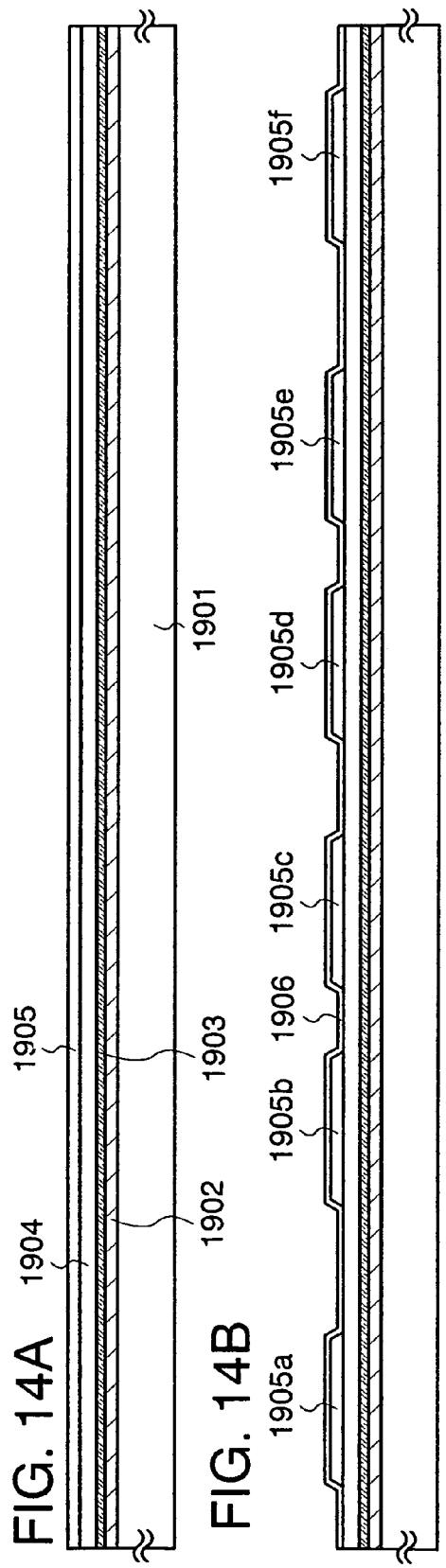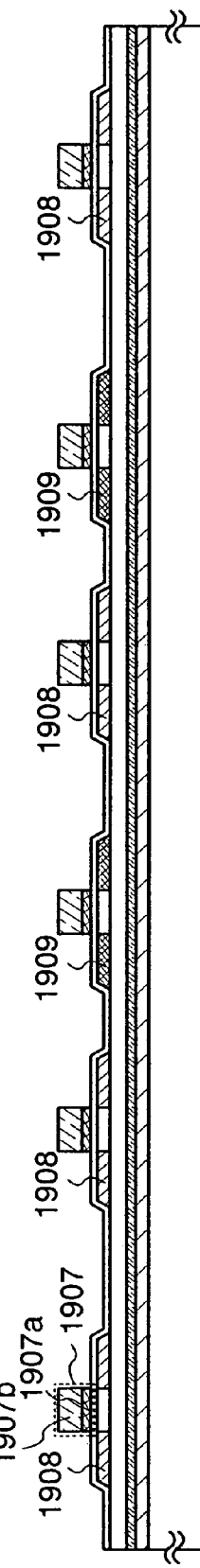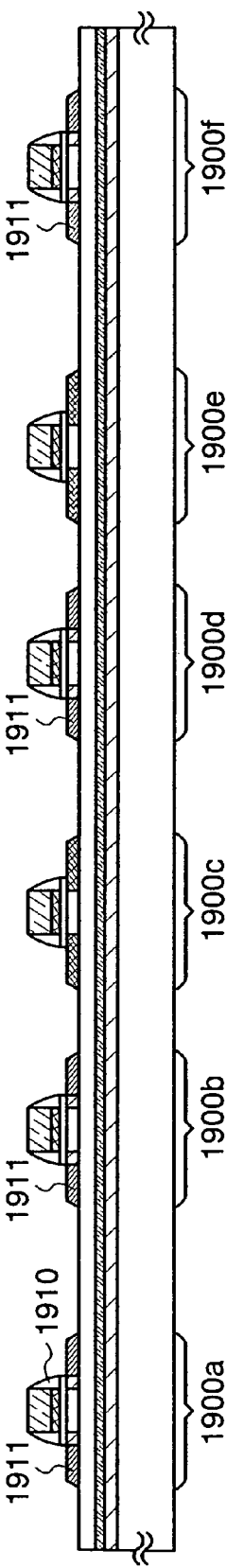

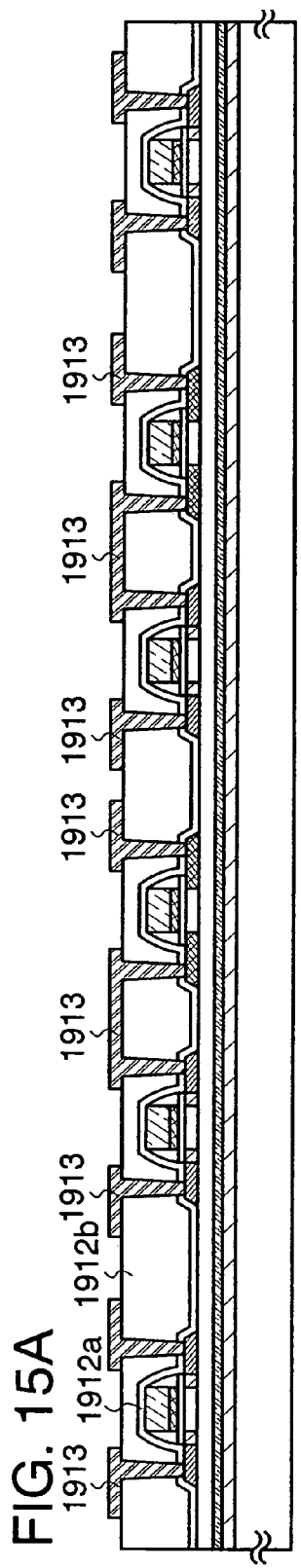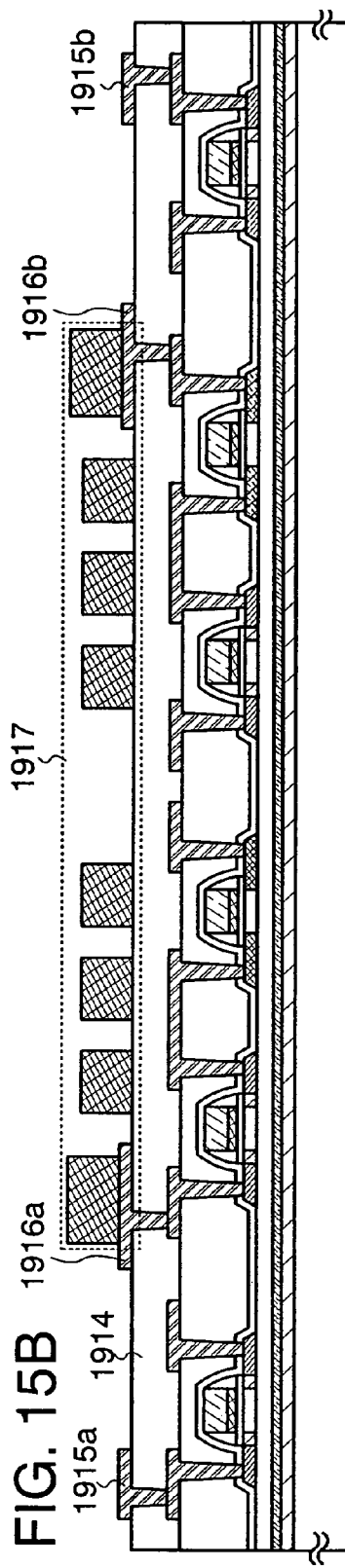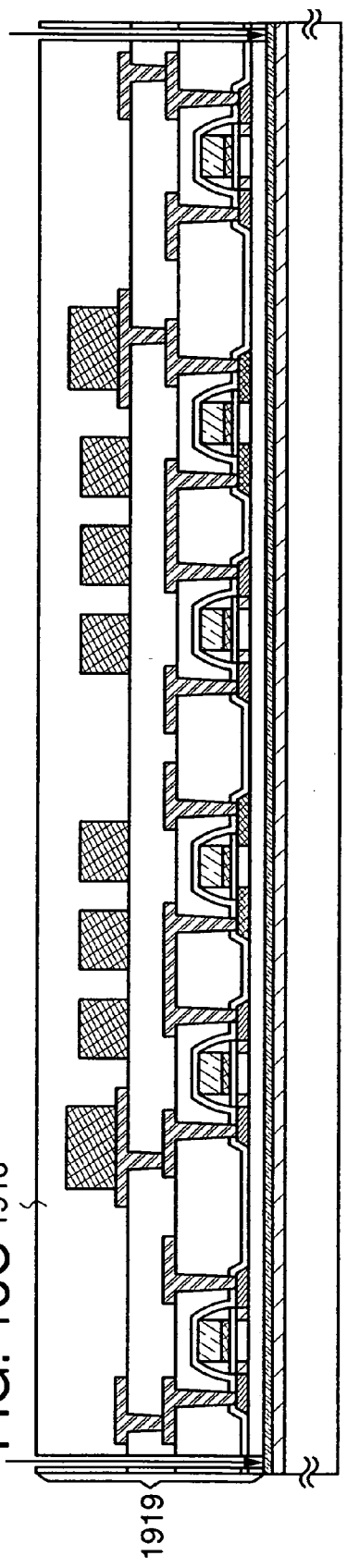

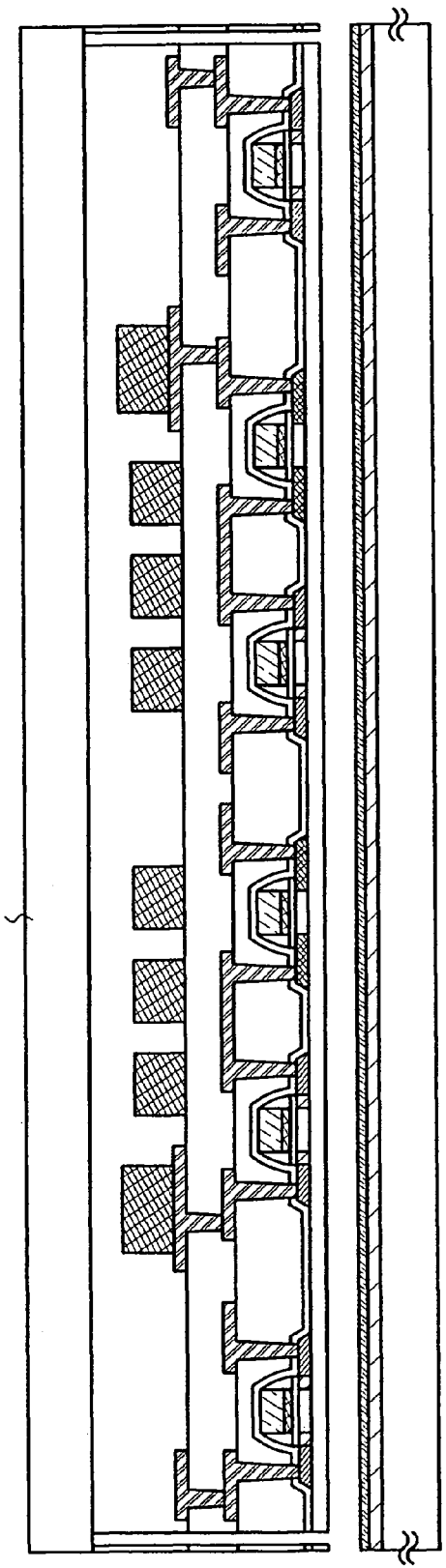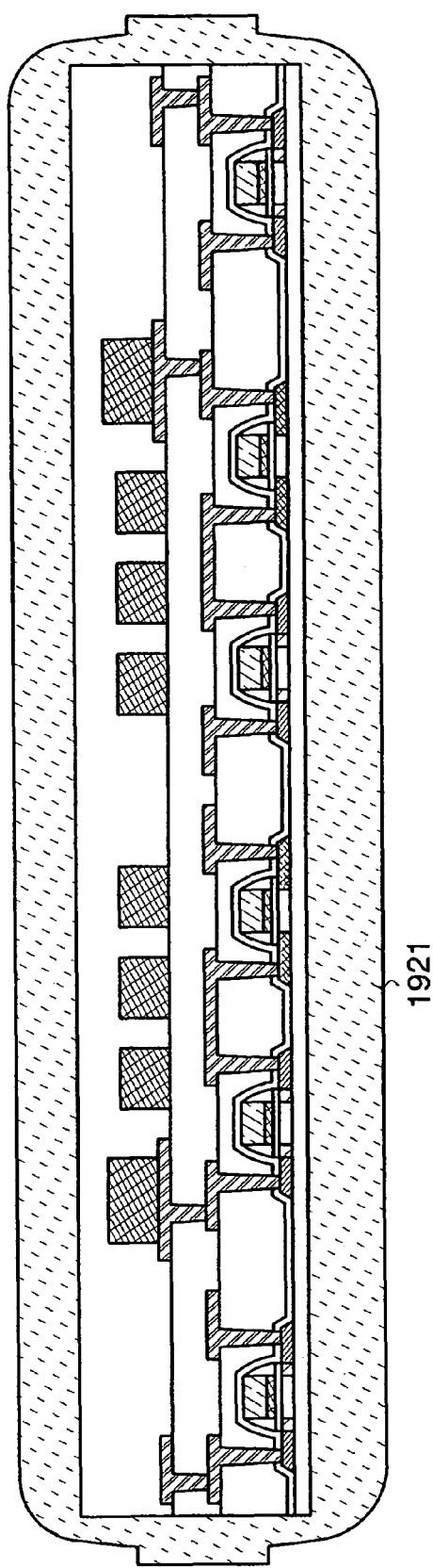
FIG. 16A
FIG. 16B

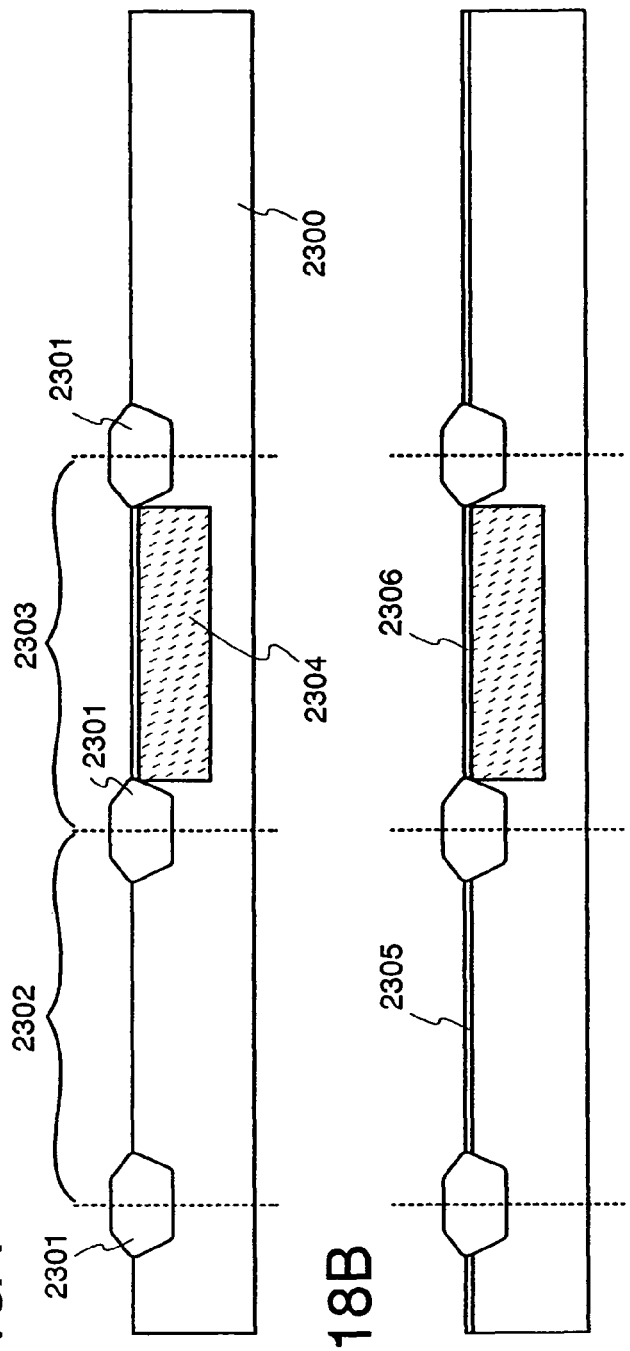
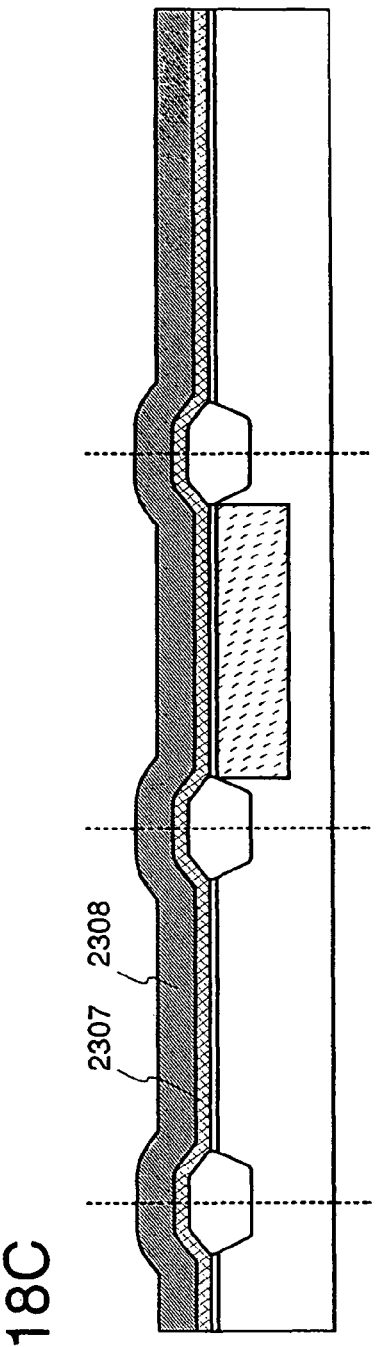
FIG. 18A
FIG. 18B
FIG. 18C

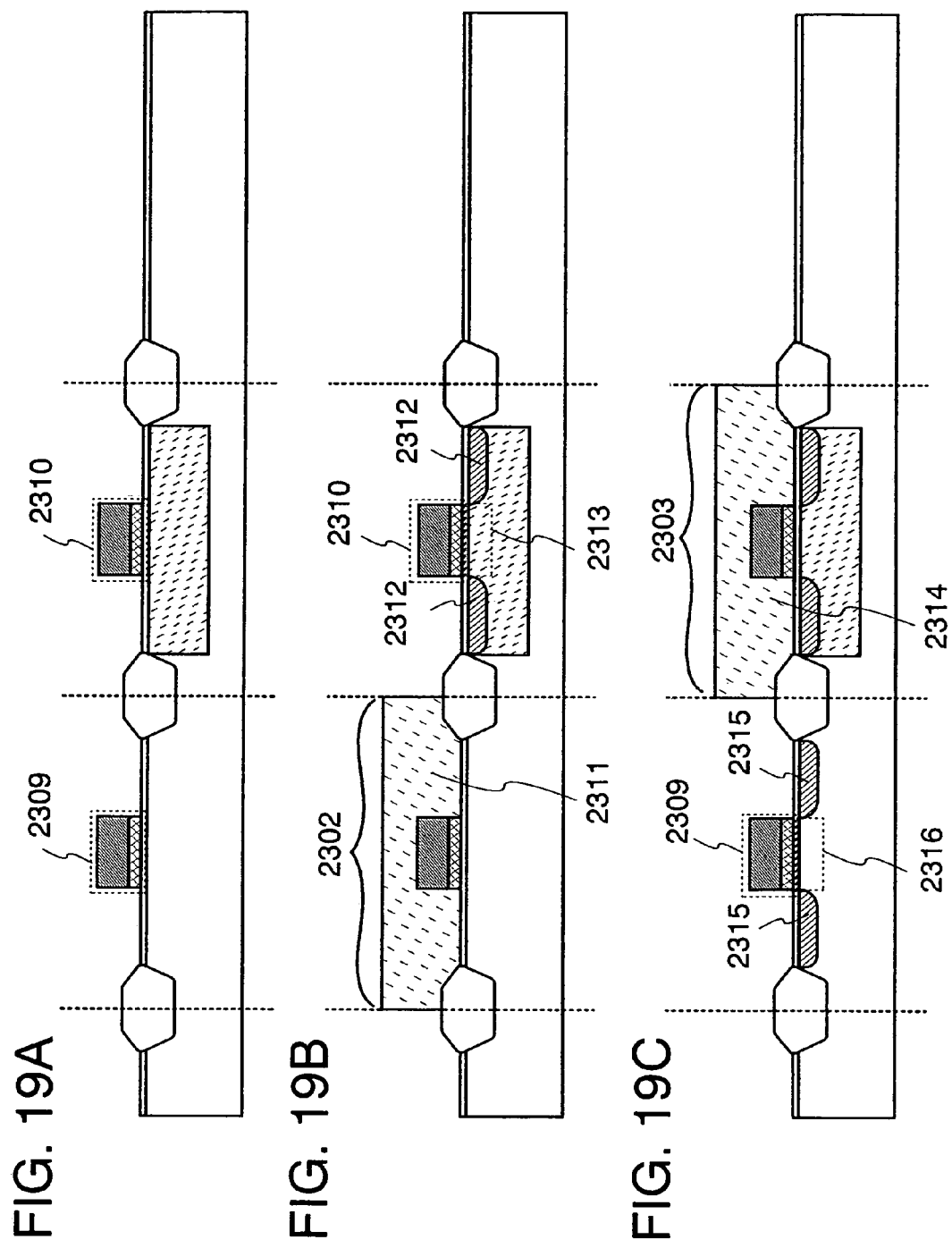

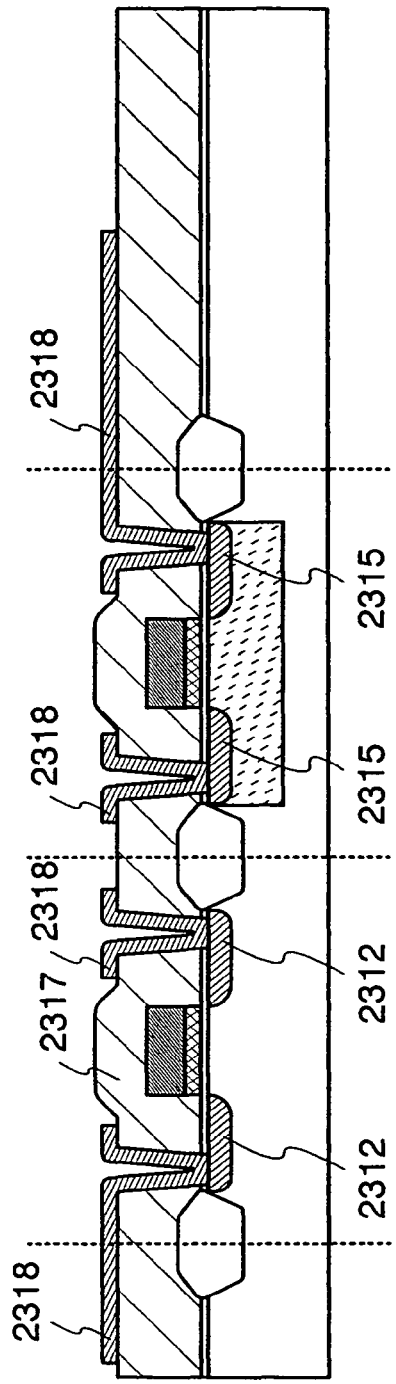
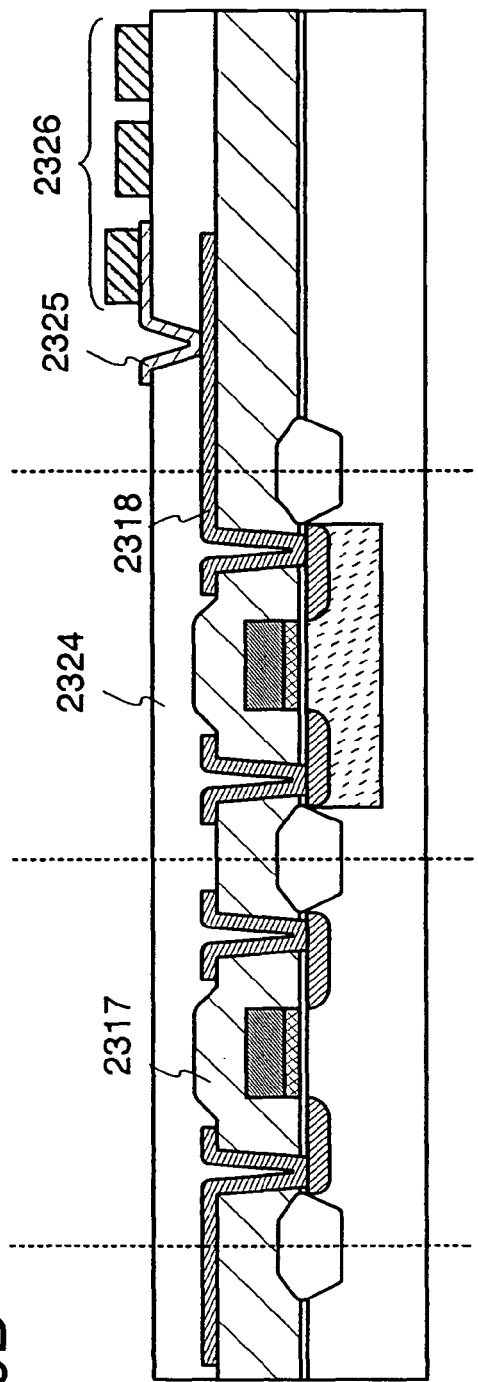
FIG. 20A
FIG. 20B

SEMICONDUCTOR DEVICE

BACKGROUND OF THE INVENTION

1. Field of the Invention

The present invention relates to a semiconductor device which transmits and receives data and detects a distance by wireless signals.

2. Description of the Related Art

In recent years, small semiconductor devices in each of which an ultrasmall IC chip and an antenna for wireless communication are combined (hereinafter also referred to as a semiconductor device or an RF chip and also called an RFID tag, a wireless tag, an ID tag, or an RF tag) have attracted attention. This semiconductor device can perform data transmission and reception, such as data writing or data reading, without contact by transmission and reception of communication signals using a wireless communication device (hereinafter also referred to as a reader/writer).

An example of fields of application of a semiconductor device which performs data transmission and reception by wireless signals is product management for the distribution industry. Product management using barcodes and the like is the mainstream at present; however, since barcodes are read optically, data cannot be read in some cases where there is an interrupting object. On the other hand, when data are transmitted and received with the use of a wireless communication device without contact, data of the semiconductor device are read wirelessly; thus, data can be read even when there is an interrupting object. Therefore, an improvement in efficiency, a reduction in cost, and the like of product management are expected. In addition, a broad range of applications such as for tickets, airline tickets, or automatic fare payment has been expected (see Japanese Published Patent Application No. 2000-149194). A system such that people and objects are identified and managed by a small semiconductor device which transmits and receives data by wireless communication is called RFID (Radio Frequency Identification) and has attracted attention as fundamental technology of the IT society.

SUMMARY OF THE INVENTION

If detection of physical location of a semiconductor device as well as data transmission and reception by wireless signals is possible, the location of a product to which a semiconductor device is attached can be identified. Thus, for example, the length of time it takes to find objects in a warehouse can be shortened. In addition, a product to which a semiconductor device is attached can be traced; thus, a retailer, for example, can know customer behavior in real time and may be able to provide services with even higher added value.

As a method for detecting the physical location of a semiconductor device, there is a received signal strength indicator (RSSI) method. This method utilizes the property that the strength of a communication signal decreases as the distance from a signal source increases. For example, when the position of a reader/writer is known and the reader/writer is a source of communication signals, the physical location of a semiconductor device can be identified by calculation of the distance from signal strength detected if the semiconductor device has a function to detect signal strength.

However, such a semiconductor device is of a type that is supplied with a power supply voltage which is necessary for circuit operations from a battery included in the device (such a type is hereinafter referred to as an active type). Consequently, periodic replacement of batteries is needed. In addition, due to limitations on the physical shape, mass, and the like of a battery, there are limitations on the physical shape, mass, and the like of a semiconductor device. Such disadvantages lead to significant loss of convenience in a service to detect physical location using a semiconductor device.

The present invention is made in view of the above problems and provides a lightweight semiconductor device, which has a function to detect physical location and has flexibility in physical shape, at low cost.

A feature of the semiconductor device of the present invention is to communicate data by wireless communication, to generate a signal, which represents information about a distance to a transmitter of a signal received, from the signal received, and to transmit the signal. A specific feature of the semiconductor device is to have a power supply circuit which has a function to generate a power supply voltage from a wireless signal and an analog-to-digital (A/D) converter circuit which has a function to detect the strength of the wireless signal by analog-to-digital (A/D) conversion of the voltage which is generated from the wireless signal.

In one aspect of the present invention, a semiconductor device has an antenna circuit which transmits and receives a wireless signal, a power supply circuit which generates an input voltage based on the wireless signal that is received by the antenna circuit, and an analog-to-digital converter circuit which converts the signal strength of the input voltage from an analog value to a digital value.

In another aspect of the present invention, a semiconductor device has an antenna circuit which transmits and receives a wireless signal, a power supply circuit which generates an input voltage based on the wireless signal received by the antenna circuit, and an analog-to-digital converter circuit which converts the signal strength of the input voltage from an analog value to a digital value. A data signal with the digital value that is based on the signal strength of the input voltage which is converted by the analog-to-digital converter circuit is transmitted from the antenna circuit to the outside.

The analog-to-digital converter circuit of the present invention may be a flash analog-to-digital converter circuit.

The analog-to-digital converter circuit of the present invention may be a successive approximation analog-to-digital converter circuit.

The analog-to-digital converter circuit of the present invention may be a multi-slope analog-to-digital converter circuit.

The analog-to-digital converter circuit of the present invention may be a $\Sigma\Delta$ analog-to-digital converter circuit.

As the analog-to-digital converter circuit of the present invention, any two of the following circuits may be provided: a flash analog-to-digital converter circuit, a successive approximation analog-to-digital converter circuit, a multi-slope analog-to-digital converter circuit, and a $\Sigma\Delta$ analog-to-digital converter circuit.

The power supply circuit and the analog-to-digital converter circuit of the present invention may each be formed using a thin film transistor.

The semiconductor device of the present invention can have a function to detect a physical location without any battery being included therein. Since the semiconductor device of the present invention does not require a battery, a lightweight semiconductor device that has flexibility in physical shape can be provided at low cost.

BRIEF DESCRIPTION OF THE DRAWINGS

FIG. 13 shows measurement results of a communication signal at the time of wireless communication in an experimental semiconductor device.

FIGS. 14A to 14D show a method for manufacturing a semiconductor device of the present invention.

FIGS. 15A to 15C show a method for manufacturing a semiconductor device of the present invention.

FIGS. 16A and 16B show a method for manufacturing a semiconductor device of the present invention.

FIGS. 18A to 18C show a method for manufacturing a semiconductor device of the present invention.

FIGS. 19A to 19C show a method for manufacturing a semiconductor device of the present invention.

FIGS. 20A and 20B show a method for manufacturing a semiconductor device of the present invention.

DETAILED DESCRIPTION OF THE INVENTION

Figure 1:
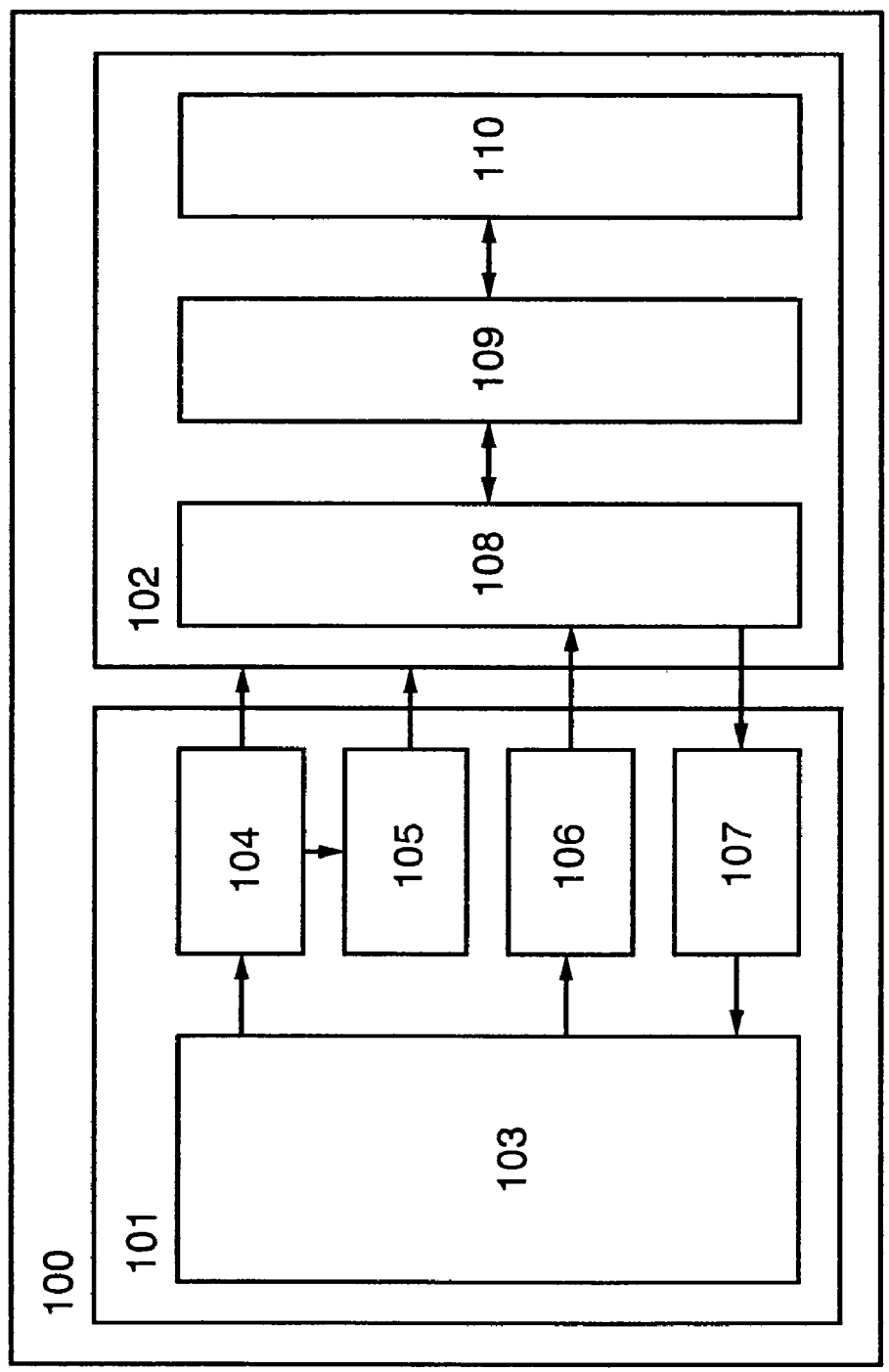
FIG. 1 is a block diagram of a semiconductor device of the present invention.

An embodiment mode and embodiments of the present invention are hereinafter described with reference to the accompanying drawings. Note that the present invention can be carried out in many different modes, and it is to be easily understood by those skilled in the art that the mode and detail of the present invention can be changed in various ways without departing from the spirit and scope of the present invention. Therefore, the present invention should not be construed as being limited to the description in the following embodiment mode and embodiments. Note that the same portions or portions having similar functions are denoted by the same reference numeral throughout the drawings illustrating the embodiment mode and the embodiments, and repetitive description thereof is omitted.

An embodiment mode of a semiconductor device of the present invention is described with reference to FIG. 1. FIG. 1 is a block diagram of a semiconductor device of the present invention.

In FIG. 1, a semiconductor device 100 has a wireless circuit 101 and a logic circuit 102. The wireless circuit 101 has an antenna circuit 103, a power supply circuit 104, a clock circuit 105, a demodulation circuit 106, and a modulation circuit 107. The logic circuit 102 has an RF interface circuit 108, an AD interface circuit 109, and an A/D converter circuit (analog-to-digital converter circuit) 110.

The antenna circuit 103 has a function to transmit and receive communication signals. The antenna circuit 103 may be provided with, for example, a coiled antenna when an electromagnetic induction method is employed or a dipole antenna when an electric field method is employed.

The power supply circuit 104 has a function to generate a power supply voltage for the clock circuit 105 and the logic circuit 102 and an input voltage and a reference voltage for the A/D converter circuit 110 from the communication signals. The power supply voltage can be generated by, for example, a rectifier circuit and a storage capacitor included in the power supply circuit 104. The input voltage for the A/D converter circuit 110 can be common to the power supply voltage or can be generated by a rectifier circuit and a storage capacitor which are different from those used to generate the power supply voltage. The reference voltage for the A/D converter circuit 110 can be generated by conversion of the power supply voltage into a given voltage by a regulator.

The clock circuit 105 has a function to generate a clock signal which is needed for operation of the logic circuit 102. For example, the clock circuit may be formed using a phase-locked loop (PLL) circuit.

The demodulation circuit 106 has a function to extract reception data from a communication signal. For example, the demodulation circuit 106 may be formed using a low-pass filter (LPF).

The modulation circuit 107 has a function to superimpose transmission data on a communication signal.

The RF interface circuit 108 transmits data and receives data between the demodulation circuit 106 and the modulation circuit 107, and the logic circuit 102. For example, the RF interface circuit 108 determines a process that is to be executed by the logic circuit 102 from the reception data which are extracted by the demodulation circuit 106 and generates a control signal or data which is needed for the process. In addition, it converts data generated by the process into transmission data and supplies the transmission data to the modulation circuit 107.

The AD interface circuit 109 generates a control signal which is needed for operation of the A/D converter circuit 110 using the control signal or the data which are generated by the RF interface circuit 108. In addition, it supplies a data signal that is output by the A/D converter circuit 110 to the RF interface circuit 108.

The A/D converter circuit 110 has a function to convert signal strength of the input voltage from an analog value into a digital value using the reference voltage and the input voltage that are generated by the power supply circuit 104 and a function to output the digital value as the data signal. The A/D converter circuit 110 may be a flash A/D converter circuit, a successive approximation A/D converter circuit, a multi-slope A/D converter circuit, or a ΣΔ A/D converter circuit, or the like. Alternatively, a circuit which measures the oscillating frequency of a ring oscillator (hereinafter also referred to as a ring oscillator A/D converter circuit) or the like may be used.

The input voltage for the A/D converter circuit 110 that is generated by the power supply circuit 104 becomes high as the signal strength of the wireless signal increases. Then, the A/D converter circuit 110 outputs the high digital value (High) as the data signal. Consequently, this data signal is transmitted from the semiconductor device 100 to the outside by a wireless signal through the antenna circuit 103, and the wireless signal is read by a reader/writer. Accordingly, it is possible to know the signal strength of the wireless signal that is received by the semiconductor device 100. The signal strength of the wireless signal decreases monotonously as the distance increases except in special circumstances such as with reflection or interruption of the wireless signal. That is, there is a one-to-one relationship between the data signal of the A/D converter circuit 110 which is transmitted by the semiconductor device 100 and the distance between the semiconductor device 100 and a reader/writer. In other words, with the use of the semiconductor device 100 of this embodiment mode, the distance between the semiconductor device 100 and the reader/writer can be detected.

Note that the semiconductor device of the present invention is of a so-called passive type that generates a power supply voltage necessary for circuit operations from a wireless signal by the power supply circuit 104. Therefore, the semiconductor device is not likely to be limited to any particular physical shape, unlike an active type semiconductor device which requires a battery for circuit operations. In addition, a reduction in size of the semiconductor device can be achieved. Furthermore, the semiconductor device can be supplied at low cost.

When the semiconductor device 100 is formed using a thin film transistor (TFT) that is formed over a glass substrate or a plastic substrate, a semiconductor device, the weight and size of which are reduced even further, can be provided at low cost. In particular, when the semiconductor device is formed using a TFT that is formed over a plastic substrate, the semiconductor device that has physical flexibility and an even higher added value can be provided.

With such a structure as that described above, the semiconductor device can be made to have a function to detect a physical location without having any battery being included therein. Since the semiconductor device of the present invention does not require a battery, a lightweight semiconductor device having flexibility in physical shape can be provided at low cost.

Embodiment 1

Figure 2:
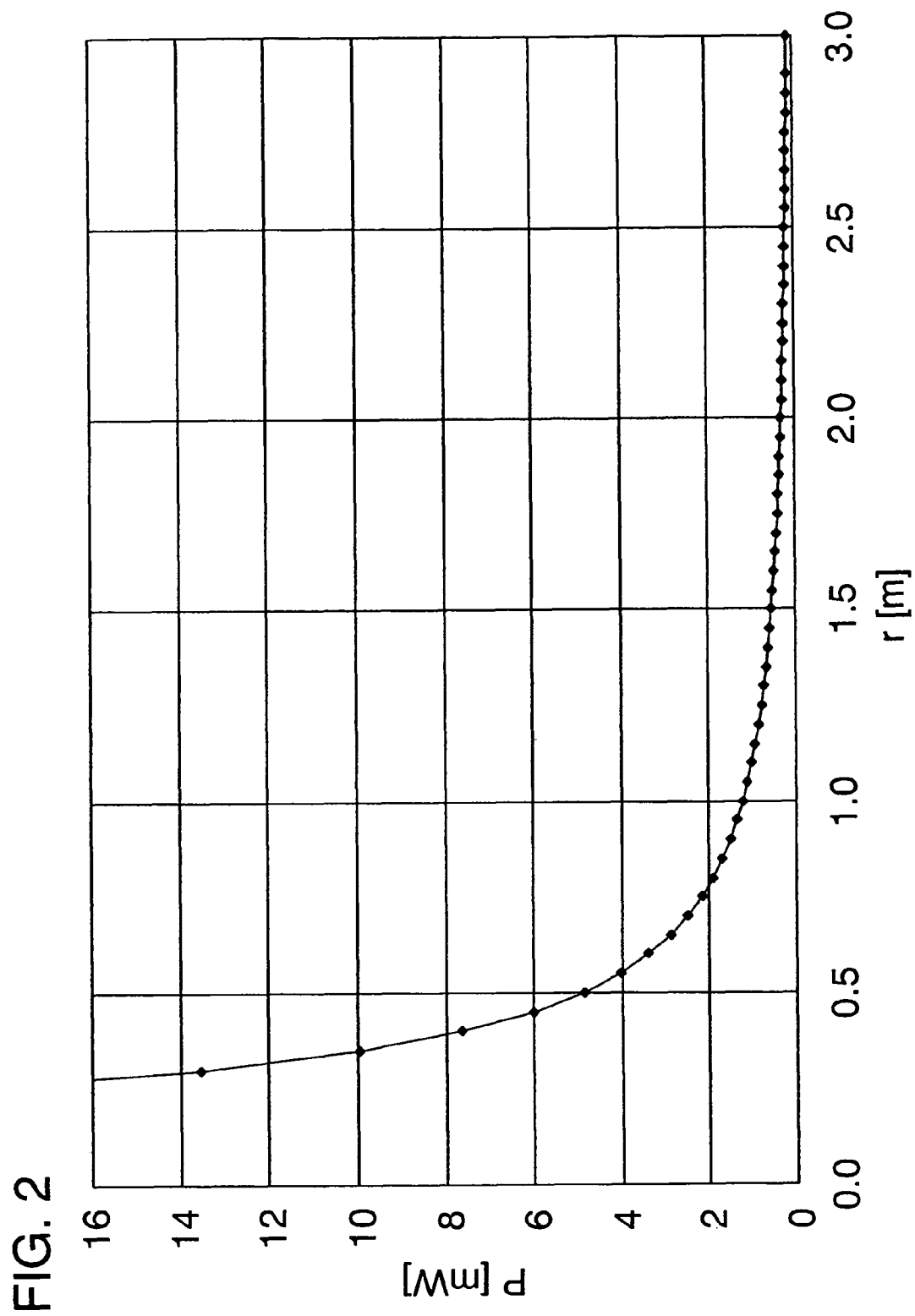
FIG. 2 shows results of theoretical calculations of dependence of communication signal on distance.

In this embodiment, the dependence of the strength of a signal received by the semiconductor device 100, which is described in the embodiment mode, on distance is described with reference to FIG. 2. FIG. 2 is a graph that is obtained by theoretical calculation of the relationship between distance and electric power of a communication signal. Note that the theoretical calculation is made to obtain electric power P (mW) of a communication signal at a distance r (m) from an infinitesimal dipole antenna when the antenna emits a communication signal having a frequency of 915 MHz and a wavelength ($\lambda$) of 0.33 m. The theoretical calculation is made under conditions where an output voltage is 30 dBm, a cable loss is −2 dB, a reflection coefficient is 0, a gain of a reader/writer is 6 dBi, a loss of a circular polarized wave is 1.93 dBi, a radiation power density is 10 log(¼πr$^2$), and a reception cross section is 10 log($\lambda^2$/4π).

FIG. 2 shows that the electric power of the communication signal decreases monotonously as the distance increases. That is, it shows that the input voltage supplied to the A/D converter circuit 110, which is generated by the power supply circuit 104 in the semiconductor device 100 that is described in the embodiment mode, also decreases monotonously as the distance increases. In other words, according to the present invention, the distance between the semiconductor device and the antenna, i.e., the reader/writer, can be detected from the data signal of the A/D converter circuit 110 that is included in the semiconductor device.

Embodiment 2

Figure 3:
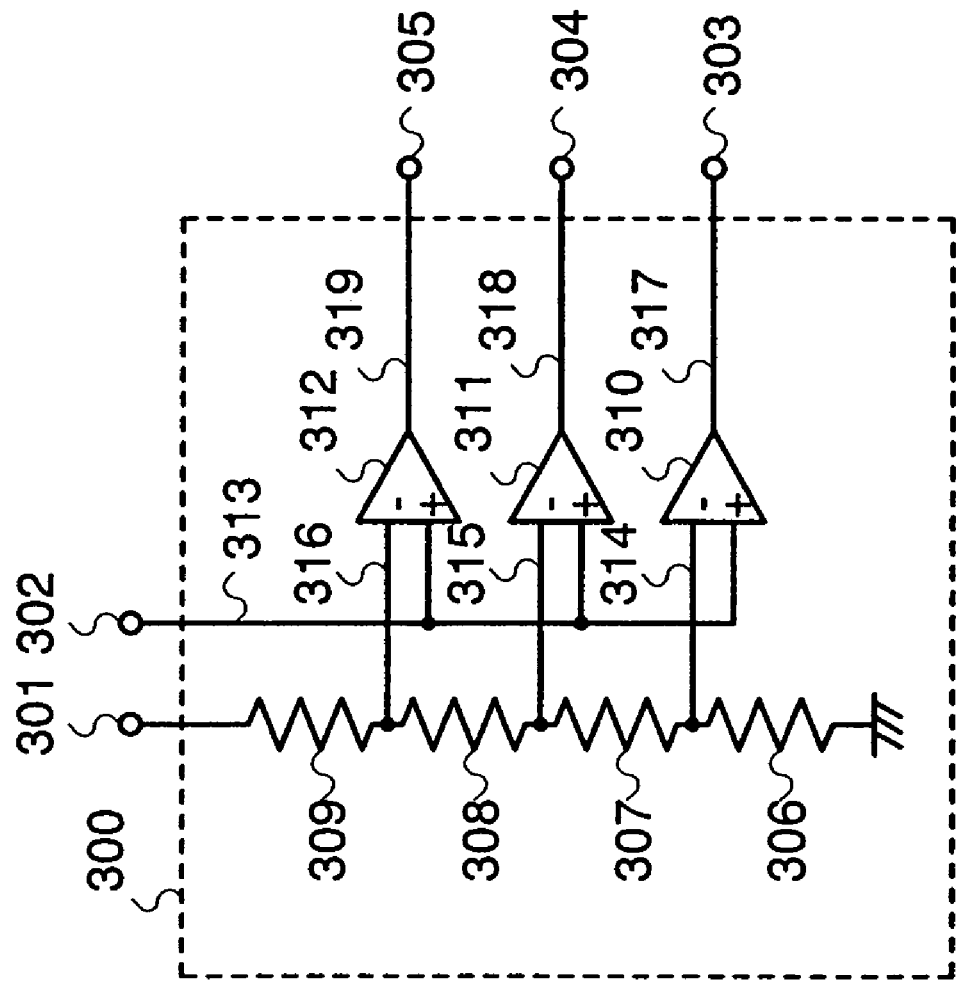
FIG. 3 is a circuit diagram of a flash A/D converter circuit.
Figure 4:
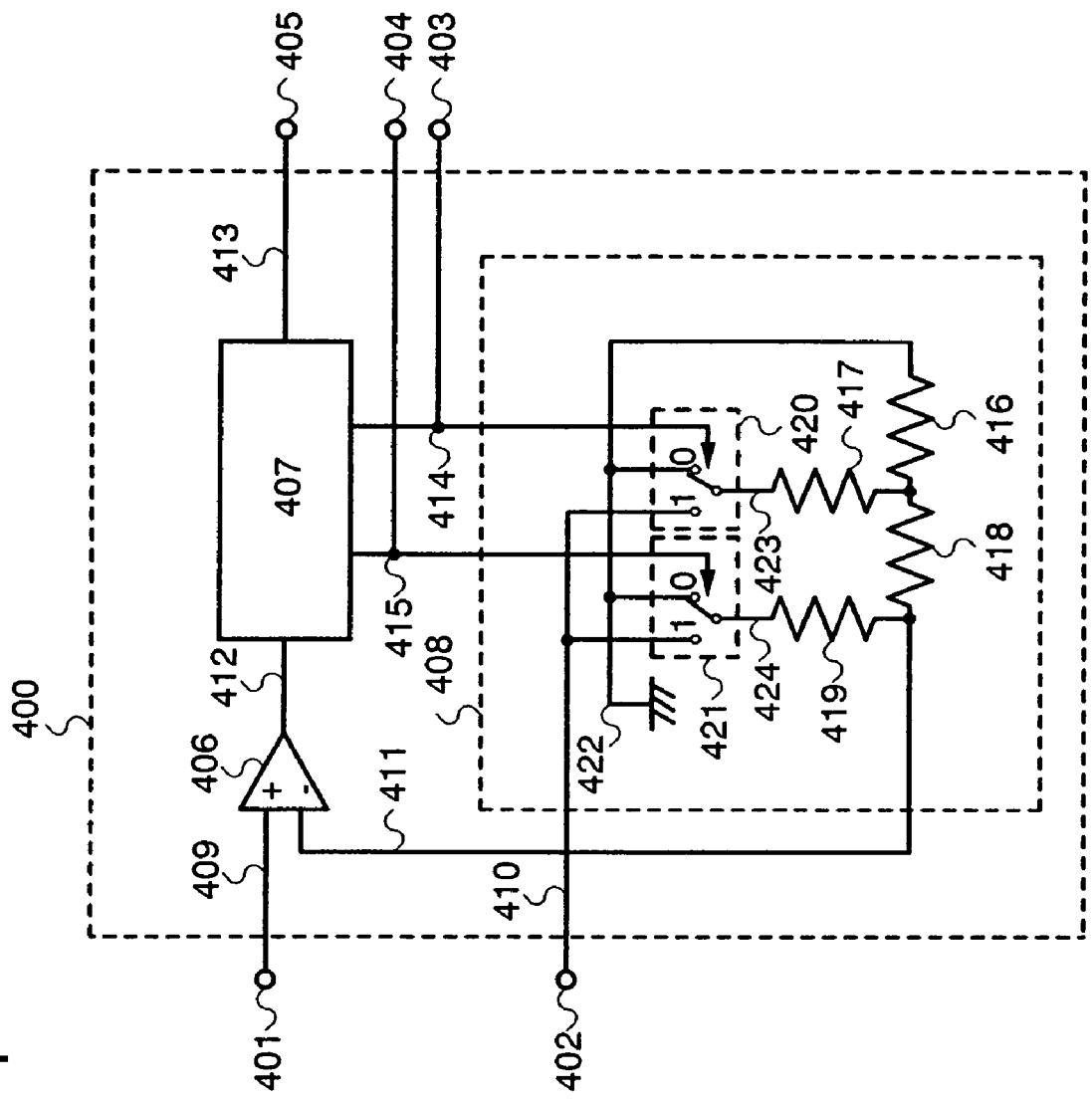
FIG. 4 is a block diagram of a successive approximation A/D converter circuit.
Figure 5:
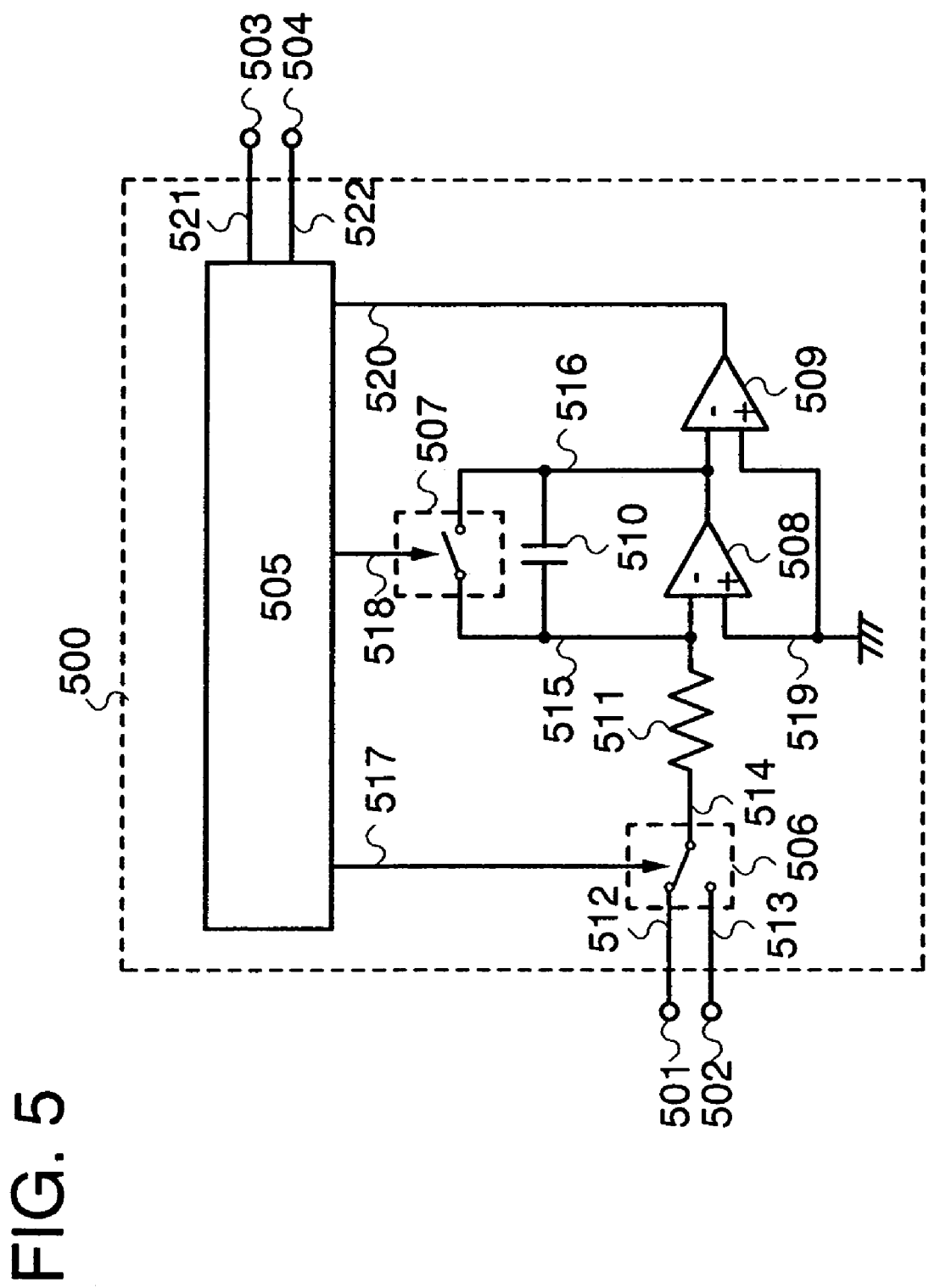
FIG. 5 is a block diagram of a multi-slope A/D converter circuit.
Figure 6:
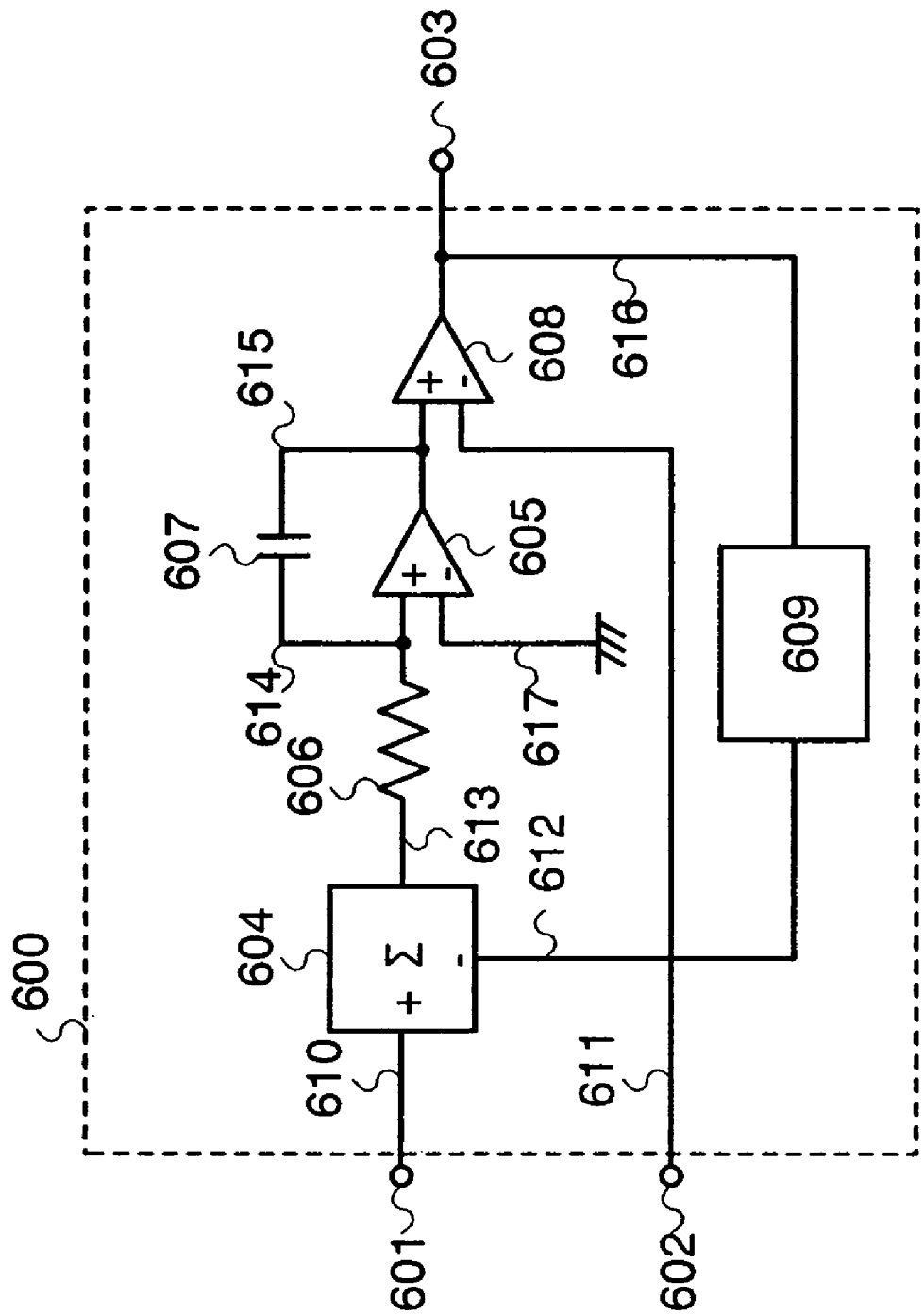
FIG. 6 is a block diagram of a ΣΔ A/D converter circuit.
Figure 7:
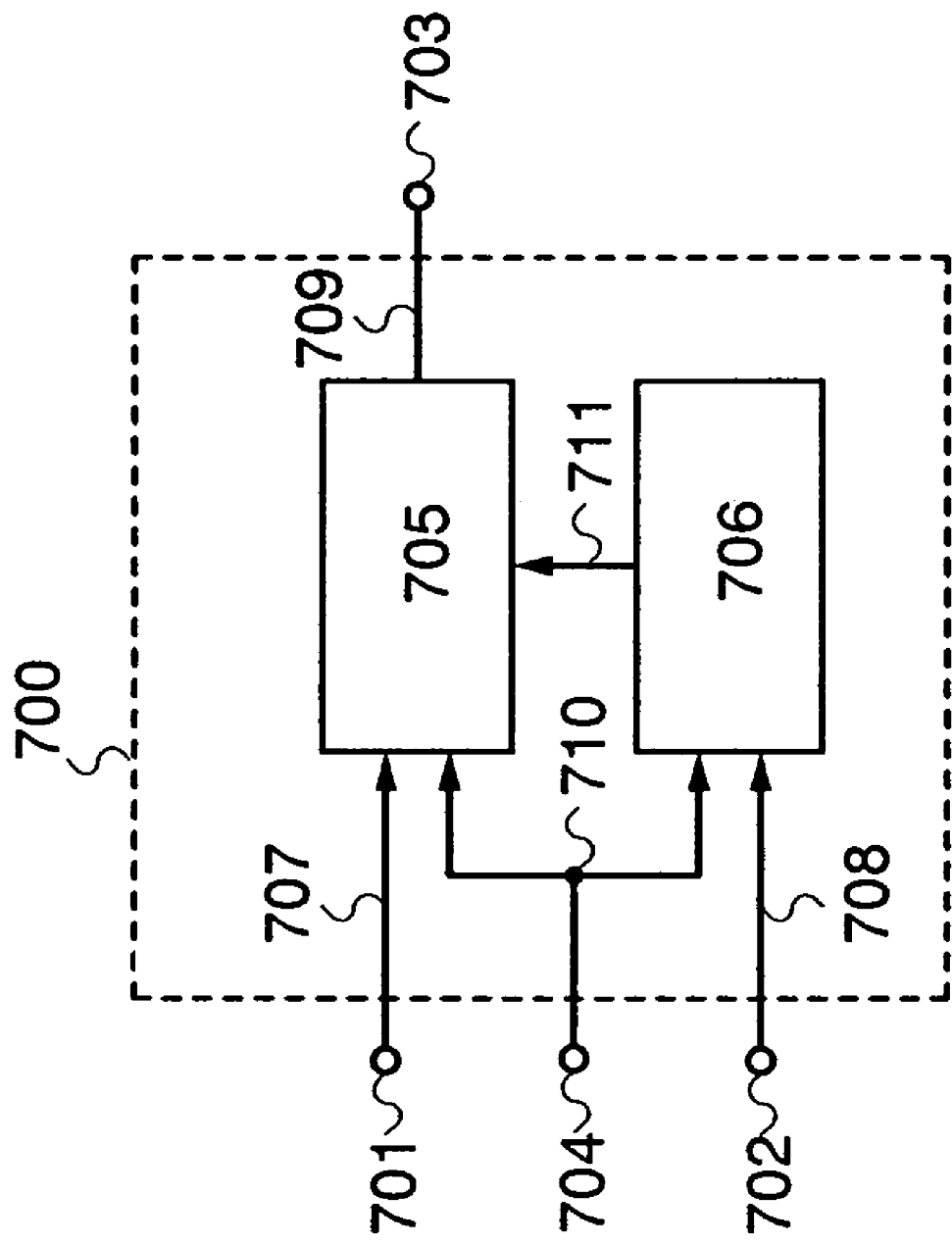
FIG. 7 is a block diagram of a ring oscillator A/D converter circuit.

In this embodiment, examples of the A/D converter circuit 110 in the semiconductor device 100 that is described in the embodiment mode are described with reference to FIGS. 3 to 7. FIG. 3 is a circuit diagram of a flash A/D converter circuit. FIG. 4 is a block diagram of a successive approximation A/D converter circuit. FIG. 5 is a block diagram of a multi-slope A/D converter circuit. FIG. 6 is a block diagram of a $\Sigma\Delta$ A/D converter circuit. FIG. 7 is a block diagram of a ring oscillator A/D converter circuit.

In FIG. 3, a flash A/D converter circuit 300 has a reference voltage terminal 301, an input voltage terminal 302, first to third output terminals 303 to 305, first to fourth resistors 306 to 309, first to third comparator circuits 310 to 312, an input voltage wiring 313, first to third reference voltage wirings 314 to 316, and first to third output wirings 317 to 319.

Here, each of the first to fourth resistors 306 to 309 can be formed of a semiconductor thin film to which an impurity is added, a metal thin film, or the like. Each of the first to third comparator circuits 310 to 312 can be formed using a differential amplifier or the like.

Next, the operation of the flash A/D converter circuit is described. First, a reference voltage and an input voltage are input from the reference voltage terminal 301 and the input voltage terminal 302, respectively. The reference voltage is divided by the first to fourth resistors 306 to 309, and the divided reference voltages are supplied to the first to third reference voltage wirings 314 to 316 as first to third reference voltages, respectively. The first to third comparator circuits 310 to 312 compare the input voltage supplied through the input voltage wiring 313 with the first to third reference voltages, respectively. When the input voltage is higher (lower), the first to third comparator circuits 310 to 312 output "H" ("L") to the first to third output wirings 317 to 319, respectively. For example, when the value of the input voltage is between the value of the first reference voltage and the value of the second reference voltage, "H," "L," and "L" are output to the first output wiring 317, the second output wiring 318, and the third output wiring 319, respectively. That is, it is possible to obtain the value of the input voltage.

Note that the difference between values of the first to third reference voltages can be set to be equal when the ratio between the values of the first to fourth resistors 306 to 309 is set to be 1:2:2:1. At this point, the first to third output wirings 317 to 319 may take the following four sets of values: "L," "L," "L"; "H," "L," "L"; "H," "H," "L"; and "H," "H," "H," which can be expressed as two-bit digital values, "00," "01," "10," "11," respectively.

With the use of the flash A/D converter circuit shown in FIG. 3 in the semiconductor device of the present invention, there is an advantage in that the amount of time it takes to make an A/D conversion is small to make an A/D conversion. Note that, although a flash A/D converter circuit having a 2-bit resolution is described in this embodiment, a flash A/D converter circuit having an n-bit resolution (where n is a natural number) can generally be used. The above description similarly applies to the case where a flash A/D converter circuit having an n-bit resolution is formed using $2^n$ resistors and $2^n-1$ comparator circuits.

In FIG. 4, a successive approximation A/D converter circuit 400 has an input voltage terminal 401, a reference voltage terminal 402, a first output terminal 403, a second output terminal 404, a control signal terminal 405, a comparator circuit 406, a successive approximation register 407, a D/A converter circuit 408, an input voltage wiring 409, a reference voltage wiring 410, a reference voltage wiring 411, a comparator circuit output wiring 412, a control signal wiring 413, a first output wiring 414, and a second output wiring 415. The D/A converter circuit 408 has first to fourth resistors 416 to 419, a first switch 420, a second switch 421, and a ground wiring 422.

The successive approximation register 407 has a two-bit storage element that includes a first storage element and a second storage element. Note that when the first storage element stores "H" and the second storage element stores "L," the value of the successive approximation register 407 is expressed as "H," "L." The values of the first storage element and the second storage element of the successive approximation register 407 are output to the first output wiring 414 and the second output wiring 415, respectively.

The first switch 420 supplies, through a first switch output wiring 423, a reference voltage that is supplied through the reference voltage wiring 410 when the potential of the first output wiring 414 is "H" and a ground potential that is supplied through the ground wiring 422 when it is "L." Similarly, the second switch 421 supplies, through a second switch output wiring 424, the reference voltage that is supplied through the reference voltage wiring 410 when the potential of the second output wiring 415 is "H" and the ground potential that is supplied through the ground wiring 422 when it is "L."

In FIG. 4, each of the first to fourth resistors 416 to 419 can be formed of a semiconductor thin film to which an impurity is added, a metal thin film, or the like. The comparator circuit 406 can be formed using a differential amplifier or the like.

Next, the operation of the successive approximation A/D converter circuit 400 is described. In a first step, a control signal by which "L," "H" is stored in the successive approximation register 407 as an initial value is supplied through the control signal wiring 413. At this point, a potential is supplied to the reference voltage wiring 411 as a first reference voltage, which is obtained by division of the reference voltage that is supplied through the reference voltage wiring 410 by the first to fourth resistors 416 to 419. The first reference voltage is compared with an input voltage by the comparator circuit 406. When the potential of the input voltage is higher (lower), "H" ("L") is output to the comparator circuit output wiring 412 as a comparator circuit output signal. Here, a control signal, by which the value of the second storage element of the successive approximation register 407 is unchanged from "H" when the comparator circuit output signal is "H" and the value of the second storage element of the successive conversion register 407 is changed to "L" when the comparator circuit output signal is "L," is supplied through the control signal wiring 413.

Next, in a second step, a control signal by which "H" is stored in the first storage element of the successive approximation register 407 is supplied through the control signal wiring 413. At this point, a potential is supplied to the reference voltage wiring 411 as a second reference voltage which is obtained by division of the reference voltage that is supplied through the reference voltage wiring 410 by the first to fourth resistors 416 to 419. The second reference voltage is compared with the input voltage by the comparator circuit 406. When the potential of the input voltage is higher (lower), "H" ("L") is output to the comparator circuit output wiring 412 as a comparator circuit output signal. Here, a control signal, by which the value of the first storage element of the successive approximation register 407 is unchanged from "H" when the comparator circuit output signal is "H" and the value of the first storage element of the successive approximation register 407 is changed to "L" when the comparator circuit output signal is "L," is supplied through the control signal wiring 413.

In this manner, the operation of the successive approximation A/D converter circuit is completed in two steps.

Here, it is possible to obtain the value of the input voltage from a first output and a second output which are supplied to the first output terminal 403 and the second output terminal 404, respectively. For example, the cases where the first output and the second output are "L" and "L," "H" and "L," "L" and "H," and "H" and "H" can be expressed as "00," "01," "10," and "11," respectively.

Note that, when the ratio between the values of the first to fourth resistors 416 to 419 are set to be 2:2:2:1, the value of the input voltage can be divided evenly and can be expressed as a digital value. For example, the first reference voltage is ½ of the reference voltage. When the comparator circuit output signal is "L," the second reference voltage is ¼ of the second reference voltage; when it is "H," the second reference voltage is ¾ of the reference voltage. That is, the operation of the successive approximation A/D converter circuit described above corresponds to steps of comparing the input voltage with a voltage that is ½ of the reference voltage first and then with a voltage that is ¼ (=0+¼) or ¾ (=½+¼) of the reference voltage, which also corresponds to a step of bringing the value of a reference voltage closer to that of the input voltage as the operation proceeds.

Because the successive approximation A/D converter circuit shown in FIG. 4 has only a single comparator circuit, a characteristic thereof is that it consumes less power. With the use of the successive approximation A/D converter circuit shown in FIG. 4 in the semiconductor device of the present invention, power consumption can be reduced. Another characteristic of the successive approximation A/D converter circuit shown in FIG. 4 is that the time it takes to make an A/D conversion is constant and short. Thus, with the use of the successive approximation A/D converter circuit shown in FIG. 4 in the semiconductor device of the present invention, there is an advantage in that the time it takes to make an A/D conversion can be distributed equally and the A/D conversion can be made in a short time. Note that, although a successive approximation A/D converter circuit that has a 2-bit resolution is described in this embodiment, a successive approximation A/D converter circuit that has an n-bit resolution (where n is a natural number) can generally be used. The above description similarly applies to the case where a successive approximation A/D converter circuit that has an n-bit resolution has the n-bit successive approximation register 407 and the operation is performed in n steps. In addition, although an example where the D/A converter circuit 408 is formed using a resistor is described in this embodiment, the D/A converter circuit 408 may be formed using a capacitor. With the use of a capacitor, a 1-bit A/D converter circuit which consumes less power and has less variation can be formed.

In FIG. 5, a multi-slope A/D converter circuit 500 has an input voltage terminal 501, a reference voltage terminal 502, an output terminal 503, a control signal terminal 504, a control circuit 505, a first switch 506, a second switch 507, an operational amplifier 508, a comparator circuit 509, a capacitor 510, a resistor 511, an input voltage wiring 512, a reference voltage wiring 513, a first switch output wiring 514, an operational amplifier input wiring 515, an operational amplifier output wiring 516, a first switch control signal wiring 517, a second switch control signal wiring 518, a ground wiring 519, a comparator circuit output wiring 520, an output wiring 521, and a control signal wiring 522.

The control circuit 505 functions to generate a first switch control signal and a second switch control signal which are to be supplied to the first switch control signal wiring 517 and the second switch control signal wiring 518 from a control signal that is supplied through the control signal wiring 522 and a comparator circuit output that is supplied through the comparator circuit output wiring 520, respectively.

Next, the operation of the multi-slope A/D converter circuit 500 is described. First, a control signal by which the control circuit 505 generates "H" as the second switch control signal is supplied through the control signal wiring 522. At this time, the second switch 507 is turned on so that electrical charges that are stored in the capacitor 510 can be made to be "0." Note that the output of the comparator circuit 509 which is supplied to the comparator circuit output wiring 520 is "H." In addition, the count value of a counter, which is included in the control circuit 505 and which operates in accordance with a clock signal with a cycle T (sec), is set to be 0.

Next, a control signal by which the control circuit 505 generates "L" as the second switch control signal and "H" as the first switch control signal is supplied through the control signal wiring 522. At this point, the second switch 507 is turned off, and an input voltage which is supplied through the input voltage wiring 512 is supplied to the first switch output wiring 514 via the first switch 506.

It can be clearly seen that the operational amplifier 508, the capacitor 510, and the resistor 511 make up an integrator circuit. Thus, when the capacitance of the capacitor 510 is C (F), the resistance of the resistor 511 is R (Ω), and the value of the input voltage is Vin (V), the output voltage of the operational amplifier which is supplied to the operational amplifier output wiring 516 through the operation for T1 seconds is $-(Vin \cdot T1)/(R \cdot C)$. Note that the integrator circuit is made to operate until the count value of a counter, which is included in the control circuit 505 and which operates in accordance with a clock signal with a cycle T (sec), reaches n1 ($T1=n1 \cdot T$). In addition, the output of the comparator circuit 509 which is supplied to the comparator circuit output wiring 520 is not changed from "H."

Next, a control signal by which the control circuit 505 generates "L" as the first switch control signal is supplied through the control signal wiring 522. At this point, a reference voltage which is supplied through the reference voltage wiring 513 is supplied to the first switch output wiring 514. In addition, the count value of the counter, which is included in the control circuit 505 and which operates in accordance with a clock signal with a cycle T (sec), is set to be 0 again.

When the reference voltage has a value of Vref (V) and has a different polarity than the input voltage, the output voltage of the operational amplifier after T seconds is $-(Vin \cdot T1)/(R \cdot C)-(-Vref \cdot T)/(R \cdot C)$. Here, after a time T2 (sec) that satisfies $T=T2=(Vin/Vref) \cdot T1$ passes, the output of the operational amplifier becomes 0 and the output of the comparator circuit 509 that is supplied to the comparator circuit output wiring 520 is changed from "H" to "L." Here, when the counter which is included in the control circuit 505 and which operates in accordance with a clock signal with a cycle T (sec) is stopped from counting, the count value is n2 ($T2=n2 \cdot T$).

The relationship $n2=(Vin/Vref) \cdot n1$ is satisfied. That is, when Vin is high (low), n2 is high (low). In other words, it is possible to obtain the value of the input voltage from n2. Specifically, the value of the input voltage can be obtained by output of the output value of the counter included in the control circuit to the output wiring 521. Note that when the control circuit includes an n-bit counters, the A/D converter circuit has an n-bit resolution.

The multi-slope A/D converter circuit shown in FIG. 5 can be used to measure the average of the input voltage over time. Therefore, with the use of the multi-slope A/D converter circuit shown in FIG. 5 in the semiconductor device of the present invention, a highly accurate operation can be performed even if the input voltage changes over time, specifically, even if noise is applied to the input voltage.

In FIG. 6, a ΣΔ A/D converter circuit 600 has an input voltage terminal 601, a reference voltage terminal 602, an output terminal 603, an adder 604, an operational amplifier 605, a resistor 606, a capacitor 607, a comparator circuit 608, a 1-bit D/A converter circuit 609, an input voltage wiring 610, a reference voltage wiring 611, a D/A converter circuit output wiring 612, an adder output wiring 613, an operational amplifier input wiring 614, an operational amplifier output wiring 615, an output signal wiring 616, and a ground wiring 617.

The adder 604 performs an analog operation on a difference between an input voltage and a D/A converter circuit output, which are supplied through the input voltage wiring 610 and the D/A converter circuit output wiring 612, respectively, and outputs it to the adder output wiring 613 as an adder output. The adder 604 can be formed using, for example, an operational amplifier.

The operational amplifier 605, the resistor 606, and the capacitor 607 make up an integrator circuit. That is, a voltage value which is obtained by integration of the adder output that is supplied through the adder output wiring 613 is supplied to the operational amplifier output wiring 615 as the operational amplifier output. When the resistance of the resistor 606 is R (Ω) and the capacitance of the capacitor 607 is C (F), the operational amplifier output is increased by $(V1 \cdot T)/(R \cdot C)$ in T seconds with respect to the adder output V1 (V).

The comparator circuit 608 compares the operational amplifier output which is supplied through the operational amplifier output wiring 615 with the reference voltage which is supplied through the reference voltage wiring 611 and supplies "H" ("L") to the output signal wiring 616 as the output signal when the operational amplifier output is higher (lower).

The 1-bit D/A converter circuit 609 supplies a first voltage to the D/A converter circuit output wiring 612 as the D/A converter circuit output when the output signal which is supplied through the output signal wiring 616 is "H" and a second voltage when it is "L." For example, the first voltage can be the reference voltage, and the second voltage can be a ground voltage.

Next, the operation of the ΣΔ A/D converter circuit 600 is described. Note that the operation starts in a state where the output signal which is supplied to the output signal wiring 616 is "L," i.e., where the D/A converter circuit output which is supplied to the D/A converter circuit output wiring 612 is 0. However, as can be seen from the following description, there is no loss of generality with the operation of the ΣΔ A/D converter circuit 600.

Here, the input voltage and the reference voltage are supplied through the input voltage wiring 610 and the reference voltage wiring 611, respectively. The adder 604 substantially outputs the input voltage to the adder output wiring 613 as the adder output. The operational amplifier 605 increases the operational amplifier output by $(V1 \cdot T)/(R \cdot C)$ in T seconds and supplies it to the operational amplifier output wiring 615.

Here, when the operational amplifier output reaches the reference voltage, the output of the comparator circuit 608 is changed to "H." Consequently, the D/A converter circuit output which is supplied to the D/A converter circuit output wiring 612 is the reference voltage. Note that the adder 604 outputs a voltage, which is obtained by subtracting the reference voltage from the input voltage, to the adder output wiring 613 as the adder output. By setting the reference voltage appropriately, the adder output becomes a voltage that has an opposite polarity to the input voltage. That is, the operational amplifier 605 performs backward integration, and the operational amplifier output is instantaneously decreased to nearly 0 V. Note that the output of the comparator circuit 608 at this point is "L." Hereinafter, a similar operation will be repeated.

It can be seen from the above-described operation that the output signal which is supplied to the output signal wiring 616 alternates between "L" and "H." In addition, the time interval between outputs of "H" is equivalent to the length of time it takes for the operational amplifier output to reach the reference voltage. Thus, when the reference voltage is Vref (V), the length of the time interval is (R·C)·(Vref/V1). In other words, as the input voltage increases (decreases), the length of the time interval between outputs of "H" decreases (increases). In addition, it can be said that the cycle is shortened (lengthened). Thus, it is possible to obtain the value of the input voltage from the output signal.

A feature of the ΣΔ A/D converter circuit shown in FIG. 6 is that it is effective in using a signal that changes over time as the input voltage. Therefore, with the use of the ΣΔ A/D converter circuit shown in FIG. 6 in the semiconductor device of the present invention, there is an advantage in that the signal that changes over time can be processed as the input voltage.

In FIG. 7, a ring oscillator A/D converter circuit 700 has an input voltage terminal 701, a reference voltage terminal 702, an output terminal 703, a control signal terminal 704, a first counter circuit 705, a second counter circuit 706, an input voltage wiring 707, a reference voltage wiring 708, an output wiring 709, a first control signal wiring 710, and a second control signal wiring 711.

The first counter circuit 705 includes a first self-oscillation circuit (ring oscillator) which uses the input voltage that is supplied through the input voltage wiring 707 as a power supply voltage and an n1-bit first counter (where n1 is a natural number). The first counter performs counting using the output of the first self-oscillation circuit as a clock signal. In addition, the first counter performs counting only during a period in which the first control signal which is supplied through the first control signal wiring 710 is "H." Further, the count value of the first counter at the moment the second control signal which is supplied through the second control signal wiring 711 becomes "H" is output to the output wiring 709 as the output signal.

The second counter circuit 706 has a second self-oscillation circuit (ring oscillator) which uses the reference voltage that is supplied through the reference voltage wiring 708 as a power supply voltage and an n2-bit second counter (where n2 is a natural number), and the second counter performs counting using the output of the second self-oscillation circuit as a clock signal. In addition, the second counter performs counting only during a period in which the first control signal which is supplied through the first control signal wiring 710 is "H." The second counter has a function to change the second control signal which is supplied to the second control signal wiring 711 from "L" to "H" when the count value reaches a specified number (here, a number N).

Next, the operation of the ring oscillator A/D converter circuit 700 is described. First, the first control signal is set to be "H." At this point, the first counter of the first counter circuit 705 and the second counter of the second counter circuit 706 start counting using the outputs of the first self-oscillation circuit and the second self-oscillation circuit as clock signals, respectively. Here, when the count value of the second counter reaches N, the second control signal is changed from "L" to "H," and the count value of the first counter (here, a number M) is supplied to the output wiring 709 as the output signal.

Note that, because the second self-oscillation circuit uses the reference voltage as the power supply voltage, the oscillating frequency thereof is constant. That is, the length of time it takes for the second counter to count to the specified number N is constant. On the other hand, because the first self-oscillation circuit uses the input voltage as the power supply voltage, the oscillating frequency thereof becomes high (low) as the input voltage becomes high (low). That is, the above-described operation corresponds to obtaining the count value of the first counter for a certain period, and the count value M of the first counter which is an output signal is proportional to the oscillating frequency of the first self-oscillation circuit. That is, it is possible to know the value of the input voltage from the output signal.

The ring oscillator A/D converter circuit shown in FIG. 7 can be formed using a small-scale circuit and has a feature that power consumption is low with respect to low input voltage. Therefore, with the use of the ring oscillator A/D converter circuit shown in FIG. 7 in the semiconductor device of the present invention, there are advantages in that the size of the semiconductor device can be reduced and the semiconductor device can be made to consume less power. In addition, another feature of the ring oscillator A/D converter circuit shown in FIG. 7 is that the relationship between the input voltage and the output signal (digital value) is nonlinear and that the ring oscillator A/D converter circuit has a high resolution with respect to low input voltage. Therefore, the ring oscillator A/D converter circuit shown in FIG. 7 in the semiconductor device of the present invention can have a high resolution when it is distant from a reader/writer and when a voltage generated from a communication signal is low.

Note that the A/D converter circuit in the semiconductor device of the present invention can be a combination of any of the above-mentioned A/D converter circuits. For example, it is possible that the successive approximation A/D converter circuit and the ring oscillator A/D converter circuit be combined with each other and the ring oscillator A/D converter circuit be used for a range of low input voltages and the successive approximation A/D converter circuit be used for a range of high input voltages. In this case, the power consumption of the semiconductor device of the present invention can be reduced.

Note that this embodiment can be freely combined with the embodiment mode described above.

With such a structure as that described above, a lightweight semiconductor device, which has a function to detect a physical location and flexibility in physical shape, can be provided at low cost.

Embodiment 3

Figure 8:
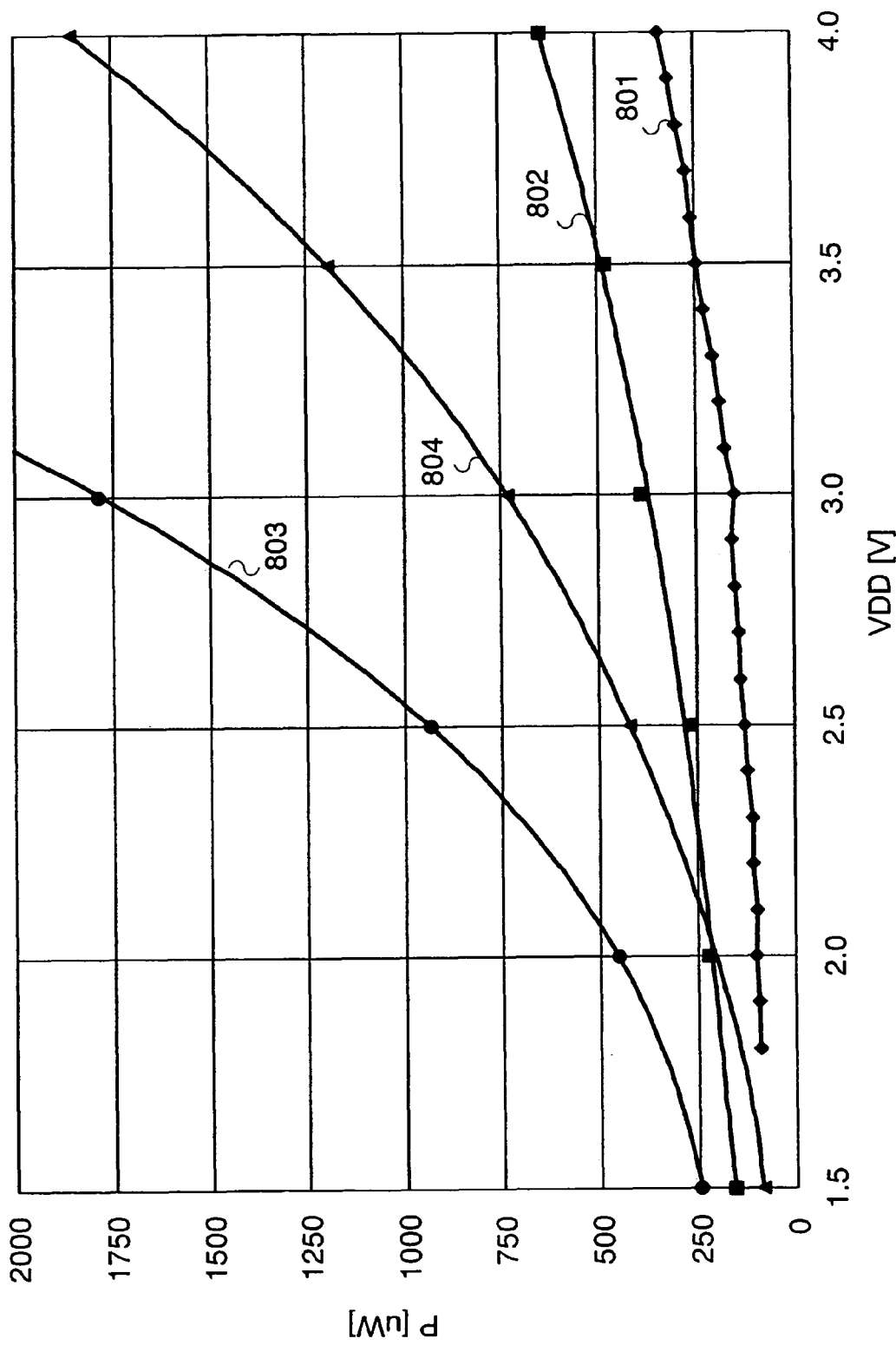
FIG. 8 shows an example of a simulation of power consumption with respect to input voltage in an A/D converter circuit.
Figure 9:
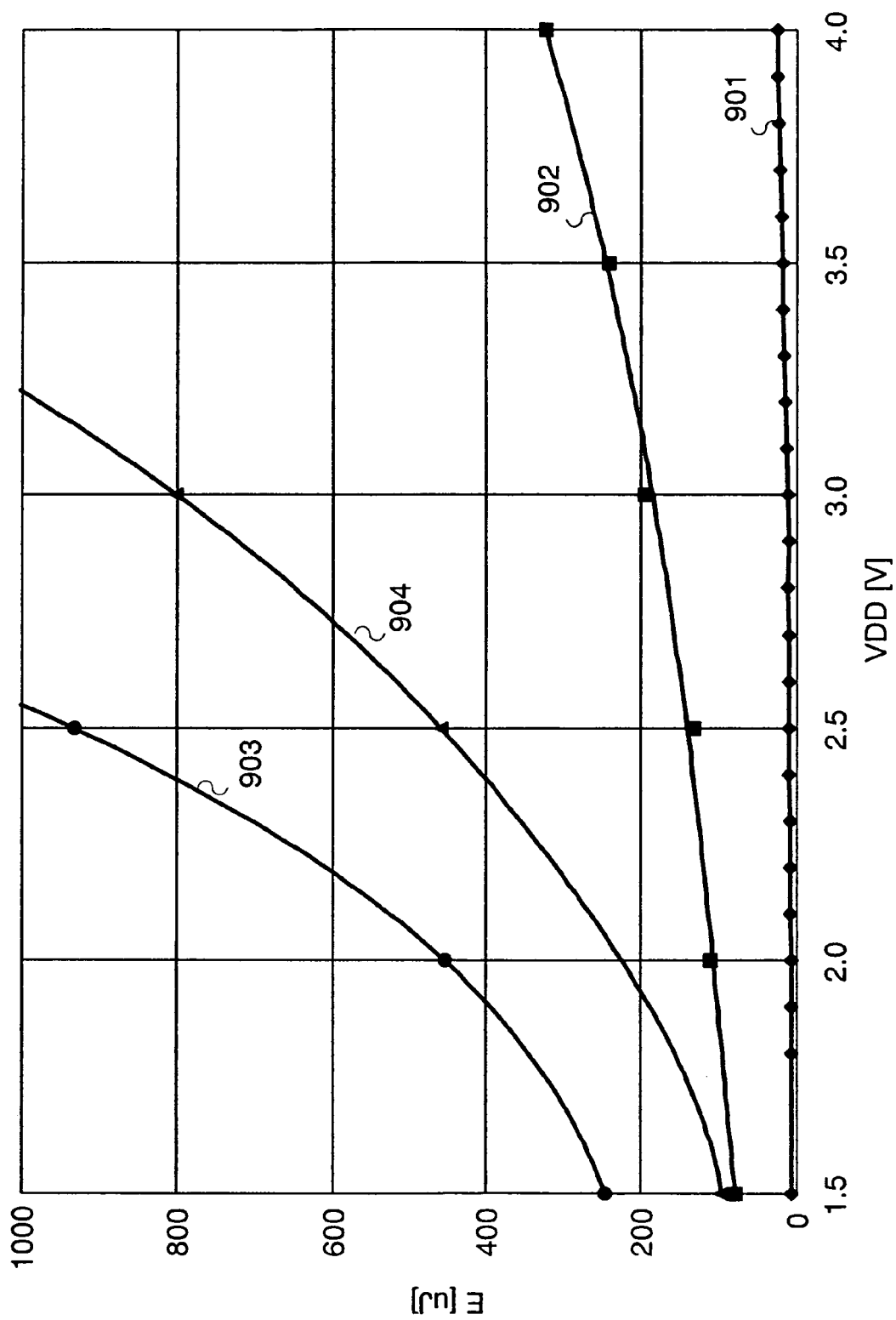
FIG. 9 shows an example of a simulation of the amount of electric power needed for a single AD conversion with respect to input voltage in an A/D converter circuit.
Figure 10:
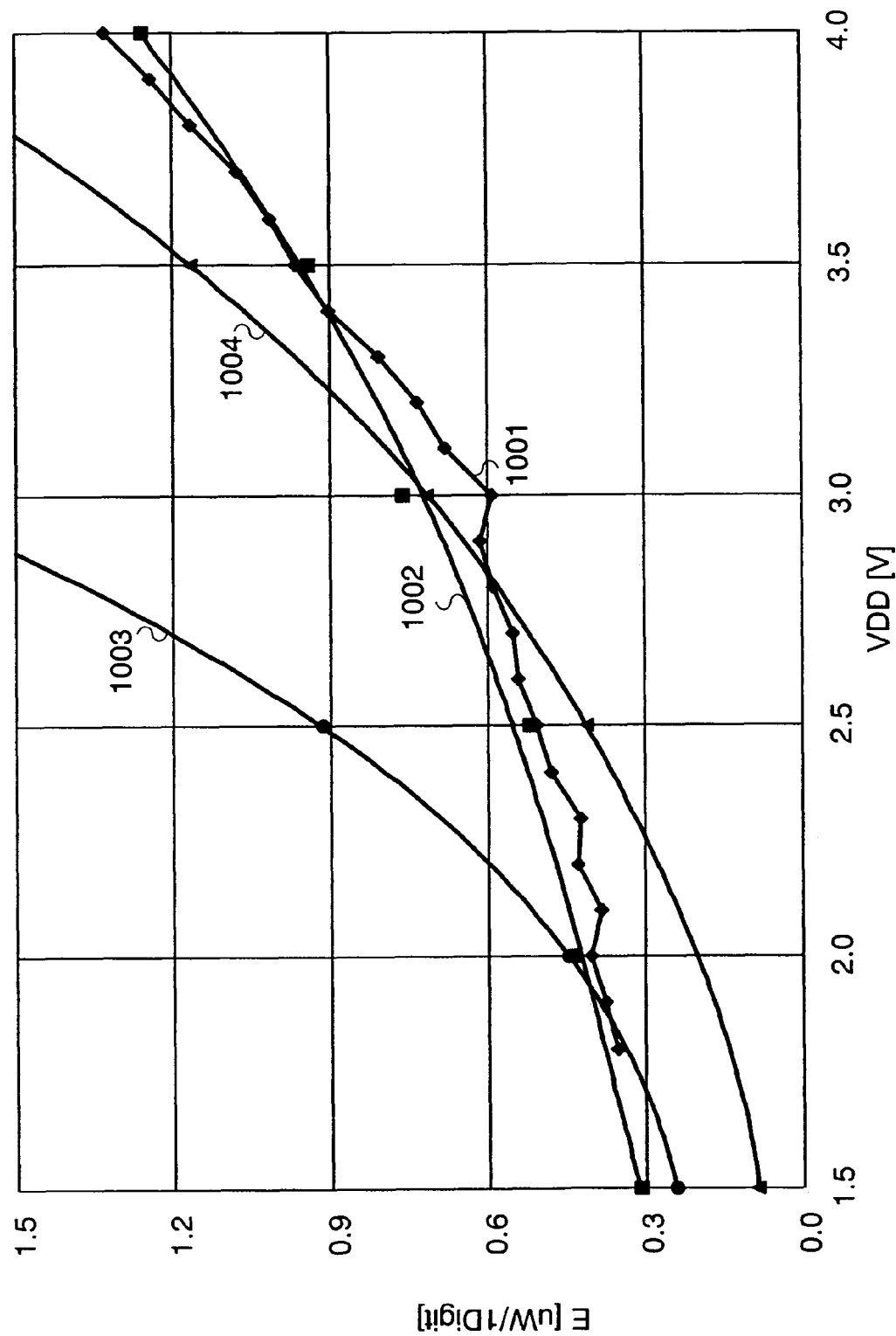
FIG. 10 shows an example of a simulation of power consumption per digital output with respect to input voltage in an A/D converter circuit.

In this embodiment, the results of a simulation of performance comparisons of various types of A/D converter circuits that are to be included in the semiconductor device of the present invention are described with reference to FIGS. 8 to 10. The performance of each of the following four types of A/D converter circuits, a successive approximation A/D converter circuit (with an 8-bit resolution), a multi-slope A/D converter circuit (with a 9-bit resolution), a ΣΔ A/D converter circuit (with a 10-bit resolution), and a ring oscillator A/D converter circuit (with a 10-bit resolution), which are described in Embodiment 2, is compared. FIG. 8 is a graph showing power consumption with respect to input voltage. FIG. 9 is a graph showing the amount of power required for a single A/D conversion. FIG. 10 is a graph showing power consumption per digital output with respect to input voltage.

Note that the A/D converter circuits used for the simulations of this embodiment are those shown in FIGS. 4 to 7 in Embodiment 2 and are formed using thin film transistors (TFTs) which are formed over a glass substrate. Note that design matters such as specific circuit structure or channel width of each transistor can be optimally set by a practitioner as appropriate.

FIG. 8 shows power consumption with respect to input voltage and simulation results 801 of the successive approximation A/D converter circuit, simulation results 802 of the multi-slope A/D converter circuit, simulation results 803 of the ΣΔ A/D converter circuit, and simulation results 804 of the ring oscillator A/D converter circuit.

The amount of power consumed by the successive approximation A/D converter circuit, the multi-slope A/D converter circuit, the ring oscillator A/D converter circuit, and the ΣΔ A/D converter circuit increases approximately in this order. Note that an increase in the amount of power consumed by the ring oscillator A/D converter circuit in accordance with an increase in input voltage is the most significant. Therefore, the ring oscillator A/D converter circuit is preferably used for a range of low input voltages.

FIG. 9 shows the amount of power required for a single A/D conversion with respect to input voltage and simulation results 901 of the successive approximation A/D converter circuit, simulation results 902 of the multi-slope A/D converter circuit, simulation results 903 of the ΣΔ A/D converter circuit, and simulation results 904 of the ring oscillator A/D converter circuit. The amount of power required for a single A/D conversion is calculated from the product of the power consumption for A/D conversion and the time required for a single A/D conversion.

The amount of power consumed by the successive approximation A/D converter circuit, the multi-slope A/D converter circuit, the ring oscillator A/D converter circuit, and the ΣΔ A/D converter circuit increases approximately in this order.

FIG. 10 shows power consumption per digital output with respect to input voltage and simulation results 1001 of the successive approximation A/D converter circuit, simulation results 1002 of the multi-slope A/D converter circuit, simulation results 1003 of the ΣΔ A/D converter circuit, and simulation results 1004 of the ring oscillator A/D converter circuit. The power consumption per digital output is calculated by dividing the power consumption shown in FIG. 8 by the number of output digital bits of the A/D converter circuit. Note that the number of output digital bits is $2^n$ when the A/D converter circuit has an n-bit resolution. A tradeoff between accuracy and power consumption of an A/D converter circuit can be evaluated quantitatively by comparing power consumption per digital output.

In a range of low input voltages lower than or equal to 2.8 V, the ring oscillator A/D converter circuit offers the best results in terms of power consumption per digital output with respect to input voltage. On the other hand, in a range of high input voltages higher than or equal to 2.8 V, the successive approximation A/D converter circuit and the ΣΔ A/D converter circuit offer the best results. Thus, in order to perform a highly accurate A/D conversion in the range of low input voltages, the ring oscillator converter circuit is preferably used. In addition, in order to perform a highly accurate A/D conversion in the range of high input voltages, the successive approximation A/D converter circuit or the ΣΔ A/D converter circuit is preferably used. In this manner, in order to perform a highly accurate A/D conversion for a wide range of input voltages, different types of A/D converter circuits are used in accordance with the values of the input voltages; accordingly, the amount of power consumed can be reduced.

Embodiment 4

Figure 11:
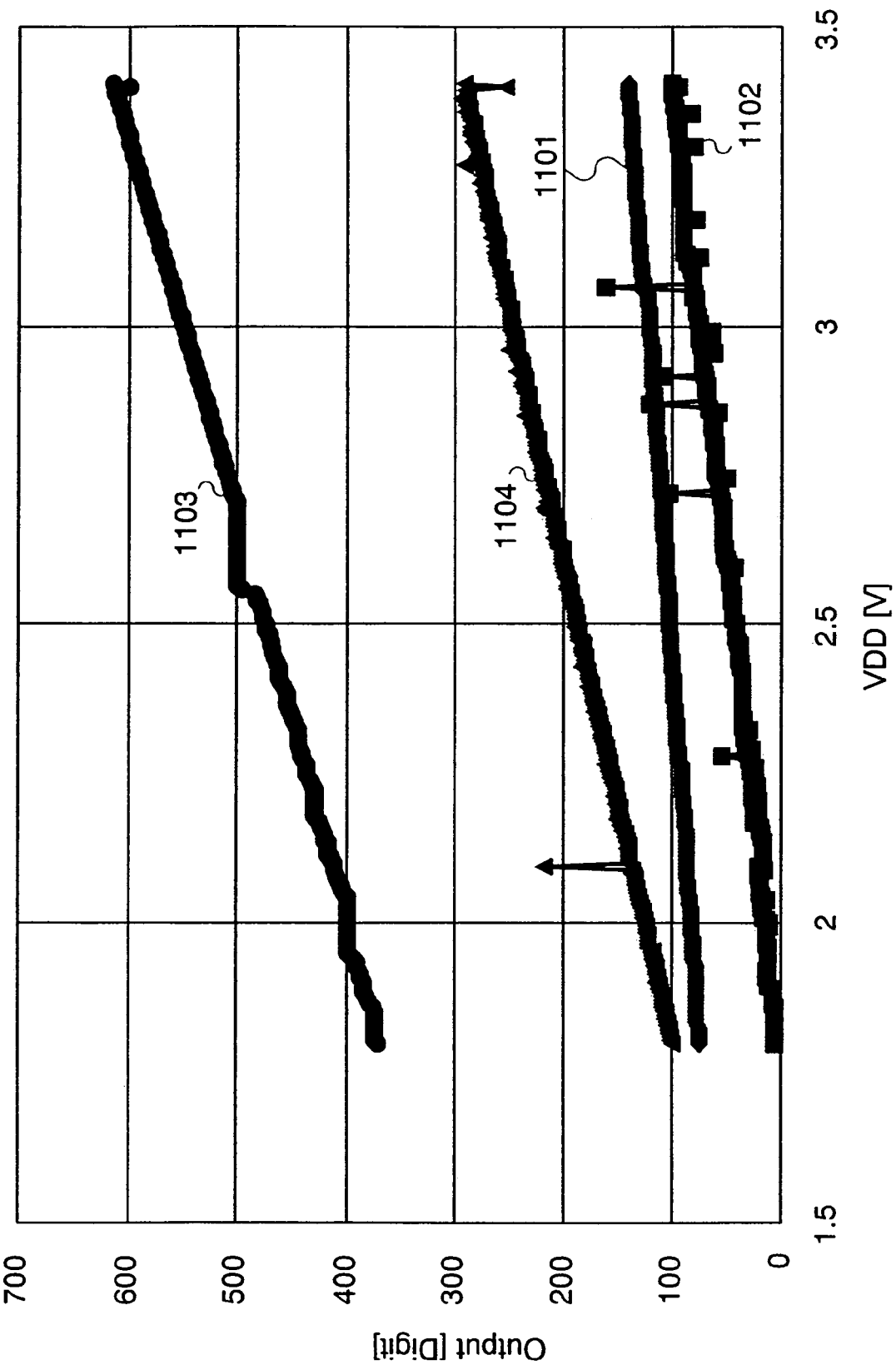
FIG. 11 shows measurement results of AD conversion output with respect to input voltage in an A/D converter circuit of an experimental semiconductor device.
Figure 12:
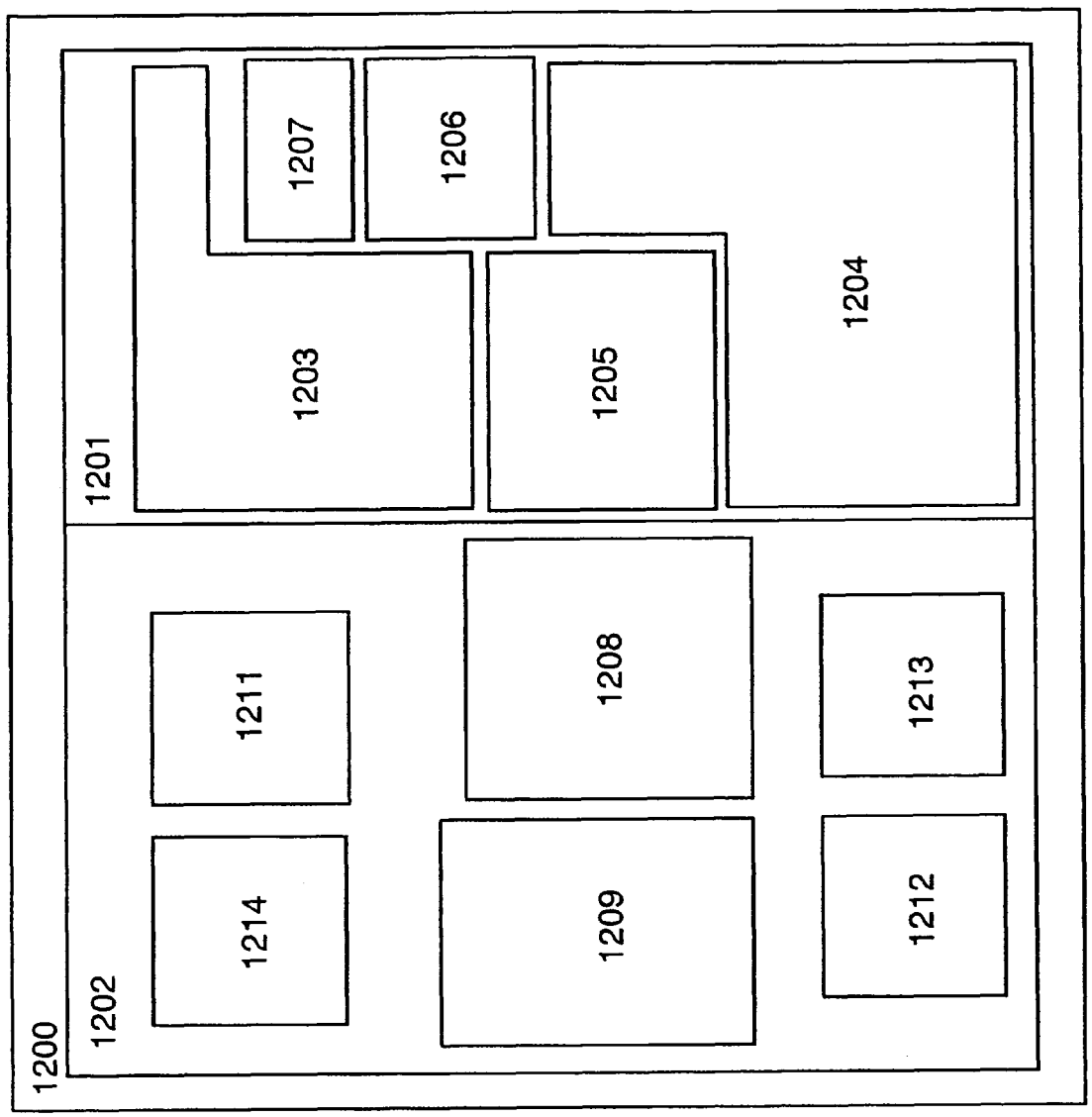
FIG. 12 is a circuit layout diagram of an experimental semiconductor device.

In this embodiment, an example of a prototype of the semiconductor device of the present invention is described with reference to FIGS. 11 to 13. As the A/D converter circuit, the four types of A/D converter circuits, the successive approximation A/D converter circuit (with an 8-bit resolution), the multi-slope. A/D converter circuit (with a 9-bit resolution), the ΣΔ A/D converter circuit (with a 10-bit resolution), and the ring oscillator A/D converter circuit (with a 10-bit resolution), which are described in Embodiments 2 and 3, were formed. FIG. 11 is a graph showing A/D conversion output with respect to input voltage. FIG. 12 is a circuit layout diagram of the semiconductor device. FIG. 13 shows measurement results of communication signals at the time of wireless communication.

FIG. 11 shows A/D conversion output with respect to input voltage and results 1101 of the successive approximation A/D converter circuit, results 1102 of the multi-slope A/D converter circuit, results 1103 of the ΣΔ A/D converter circuit, and results 1104 of the ring oscillator A/D converter circuit. Voltage resolutions per digital output of the successive approximation A/D converter circuit, the multi-slope A/D converter circuit, the ΣΔ A/D converter circuit, and the ring oscillator A/D converter circuit are 24.61 mV, 15.94 mV, 6.62 mV, and 8.41 mV, respectively. Note that the voltage resolution per digital output of each A/D converter circuit is obtained from the slope of an approximation line by a least squares method.

In FIG. 12, a semiconductor device 1200 has a wireless circuit 1201 and a logic circuit 1202. The wireless circuit 1201 has an antenna circuit 1203, a power supply circuit 1204, a clock circuit 1205, a demodulation circuit 1206, and a modulation circuit 1207. The logic circuit 1202 has an RF interface circuit 1208, an AD interface circuit 1209, a successive approximation A/D converter circuit 1211, a multi-slope A/D converter circuit 1212, a ΣΔ A/D converter circuit 1213, and a ring oscillator A/D converter circuit 1214. Note that the block configuration of the semiconductor device described in this embodiment corresponds to that in which the A/D converter circuit 110 in FIG. 1 described in the embodiment mode is formed using four types of A/D converter circuits. Thus, the description of each part is omitted.

FIG. 13 shows a reception signal 1301 and a transmission signal 1302 of the semiconductor device in this embodiment. The measurement is performed as follows. First, a wireless signal which is generated by superimposition of data generated by a pattern generator and a carrier wave (an RF signal of 915 MHz) that is performed by a mixer is transmitted from an antenna to the semiconductor device. Here, the pattern generator generates data for performing a single A/D conversion by the A/D converter circuit. The transmission signal 1302 from the semiconductor device is received by the antenna and detected by a spectrum analyzer. FIG. 13 shows that the semiconductor device operates normally.

Embodiment 5

In this embodiment, an example of a method for manufacturing the semiconductor device described in the above embodiment mode is described with reference to drawings. In this embodiment, a structure in which an antenna circuit to be included in the semiconductor device and the semiconductor device are formed over the same substrate is described. Note that a reduction in size can be achieved by formation of the antenna circuit and the semiconductor device over the same substrate and by use of thin film transistors as transistors included in the semiconductor device.

First, as shown in FIG. 14A, a peeling layer 1903 is formed over one surface of a substrate 1901 with an insulating film 1902 interposed therebetween, and then an insulating film 1904 functioning as a base film and a semiconductor film (e.g., a film containing amorphous silicon) 1905 are stacked thereover. It is to be noted that the insulating film 1902, the peeling layer 1903, the insulating film 1904, and the semiconductor film 1905 can be formed consecutively.

Note that the substrate 1901 is selected from a glass substrate, a quartz substrate, a metal substrate (e.g. a stainless steel substrate), a ceramic substrate, a semiconductor substrate such as a Si substrate, and the like. Alternatively, a plastic substrate made of polyethylene terephthalate (PET), polyethylene naphthalate (PEN), polyether sulfone (PES), acrylic, or the like can be used. In this process, although the peeling layer 1903 is provided over the entire surface of the substrate 1901 with the insulating film 1902 interposed therebetween, the peeling layer 1903 can also be selectively formed as necessary by photolithography after being provided over the entire surface of the substrate 1901.

The insulating films 1902 and 1904 are formed using an insulating material such as silicon oxide, silicon nitride, silicon oxynitride ($SiO_xN_y$, where x>y>0), or silicon nitride oxide ($SiN_xO_y$, where x>y>0) by a CVD method, a sputtering method, or the like. For example, when each of the insulating films 1902 and 1904 is formed to have a two-layer structure, a silicon nitride oxide film may be formed as a first insulating film and a silicon oxynitride film may be formed as a second insulating film. Alternatively, a silicon nitride film may be formed as a first insulating film and a silicon oxide film may be formed as a second insulating film. The insulating film 1902 functions as a blocking layer which prevents an impurity element contained in the substrate 1901 from getting mixed into the peeling layer 1903 or elements formed thereover. The insulating film 1904 functions as a blocking layer which prevents an impurity element contained in the substrate 1901 or the peeling layer 1903 from getting mixed into elements formed over the insulating film 1904. In this manner, forming the insulating films 1902 and 1904 which function as the blocking layers can prevent adverse effects on the elements formed over the peeling layer 1903 or the insulating film 1904, which would otherwise be caused by an alkali metal such as Na or an alkaline earth metal contained in the substrate 1901 or by the impurity element contained in the peeling layer 1903. It is to be noted that when quartz is used for the substrate 1901, for example, the insulating film 1902 may be omitted.

The peeling layer 1903 may be formed using a metal film, a stacked structure of a metal film and a metal oxide film, or the like. As a metal film, either a single layer or stacked layers is/are formed using an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material containing such an element as its main component. In addition, such materials can be formed by a sputtering method, various CVD methods such as a plasma CVD method, or the like. A stacked structure of a metal film and a metal oxide film can be obtained by the steps of forming the above-mentioned metal film, applying plasma treatment thereto under an oxygen atmosphere or an $N_2O$ atmosphere or applying heat treatment thereto under an oxygen atmosphere or an $N_2O$ atmosphere, thereby forming oxide or oxynitride of the metal film on the surface of the metal film. For example, when a tungsten film is provided as a metal film by a sputtering method, a CVD method, or the like, a metal oxide film of tungsten oxide can be formed on the surface of the tungsten film by application of plasma treatment to the tungsten film. In this case, an oxide of tungsten is expressed as $WO_x$, and x is 2 to 3. There are cases of x=2 ($WO_2$), x=2.5 ($W_2O_5$), x=2.75 ($W_4O_{11}$), x=3 ($WO_3$), and the like. When tungsten oxide is formed, there is no particular limitation on the value of "x", and thus, which of the above oxides is to be formed may be determined based on the etching rate or the like. In addition, after a metal film (e.g., tungsten) is formed, an insulating film formed of silicon oxide ($SiO_2$) or the like may be formed over the metal film by a sputtering method, and also metal oxide (e.g., tungsten oxide on tungsten) may be formed on the metal film. Moreover, high-density-plasma treatment as described above may be applied as the plasma treatment, for example. Besides, metal nitride or metal oxynitride may also be formed. In that case, plasma treatment or heat treatment may be applied to the metal film under a nitrogen atmosphere or an atmosphere containing nitrogen and oxygen.

The semiconductor film 1905 is formed with a thickness of 25 to 200 nm (preferably, 30 to 150 nm) by a sputtering method, an LPCVD method, a plasma CVD method, or the like.

Next, as shown in FIG. 14B, the semiconductor film 1905 is crystallized by laser irradiation. Alternatively, the crystallization of the semiconductor film 1905 may be performed by a method combining the laser irradiation with a thermal crystallization method using RTA or an annealing furnace or with a thermal crystallization method using a metal element that promotes the crystallization. After that, the crystalline semiconductor film obtained is etched into a desired shape, whereby crystallized crystalline semiconductor films 1905a to 1905f are formed. Then, a gate insulating film 1906 is formed so as to cover the semiconductor films 1905a to 1905f.

The gate insulating film 1906 is formed using an insulating material such as silicon oxide, silicon nitride, silicon oxynitride ($SiO_xN_y$, where x>y>0), or silicon nitride oxide ($SiN_xO_y$, where x>y>0) by a CVD method, a sputtering method, or the like. For example, when the gate insulating film 1906 is formed to have a two-layer structure, a silicon oxynitride film may be formed as a first insulating film and a silicon nitride oxide film may be formed as a second insulating film. Alternatively, a silicon oxide film may be formed as a first insulating film and a silicon nitride film may be formed as a second insulating film.

An example of a formation process of the crystalline semiconductor films 1905a to 1905f is briefly explained below. First, an amorphous semiconductor film with a thickness of 50 to 60 nm is formed by a plasma CVD method. Then, a solution containing nickel which is a metal element that promotes crystallization is retained on the amorphous semiconductor film, which is followed by dehydrogenation treatment (500° C. for one hour) and thermal crystallization treatment (550° C. for four hours). Thus, a crystalline semiconductor film is formed. Then, the crystalline semiconductor film is subjected to laser irradiation and then a photolithography process to form the crystalline semiconductor films 1905a to 1905f. Note that crystallization of the amorphous semiconductor film may be performed only by laser irradiation, not by thermal crystallization which uses a metal element that promotes crystallization.

As a laser oscillator used for the crystallization, either a continuous wave laser oscillator (a CW laser oscillator) or a pulsed laser oscillator can be used. As a laser that can be used here, there are a gas laser such as an Ar laser, a Kr laser, or an excimer laser; a laser whose medium is single-crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ doped with one or more of Nd, Yb, Cr, Ti, Ho, Er, Tm, and Ta as a dopant; a glass laser; a ruby laser; an alexandrite laser; a Ti:sapphire laser; a copper vapor laser; and a gold vapor laser. When irradiation is performed with the fundamental wave of such a laser beam or the second to fourth harmonics of such a laser beam, crystals with a large grain size can be obtained. For example, the second harmonic (532 nm) or the third harmonic (355 nm) of an Nd:YVO$_4$ laser (the fundamental wave of 1064 nm) can be used. In this case, a laser power density of approximately 0.01 to 100 MW/cm$^2$ (preferably, 0.1 to 10 MW/cm$^2$) is needed, and irradiation is performed with a scanning rate of approximately 10 to 2000 cm/sec. Note that the laser whose medium is single crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ doped with one or more of Nd, Yb, Cr, Ti, Ho, Er, Tm, and Ta as a dopant; an Ar ion laser; or a Ti:sapphire laser can be used as a CW laser, whereas it can also be used as a pulsed laser with a repetition rate of 10 MHz or more by a Q-switch operation, mode locking, or the like. When a laser beam with a repetition rate of 10 MHz or more is used, a semiconductor film is irradiated with the next pulse during the period in which the semiconductor film has been melted by the laser beam and is solidified. Therefore, unlike the case of using a pulsed laser with a low repetition rate, a solid-liquid interface in the semiconductor film can be continuously moved. Thus, crystal grains which have grown continuously in the scanning direction can be obtained.

The gate insulating film 1906 may be formed by oxidization or nitridation of the surfaces of the semiconductor films 1905a to 1905f by the above-described high-density plasma treatment. For example, plasma treatment with a mixed gas of a rare gas such as He, Ar, Kr, or Xe and oxygen, nitrogen oxide (NO$_2$), ammonia, nitrogen, or hydrogen is conducted. When plasma is excited by the introduction of microwaves, plasma with a low electron temperature and high density can be generated. With oxygen radicals (which may include OH radicals) or nitrogen radicals (which may include NH radicals) which are generated by the high-density plasma, a surface of a semiconductor film can be oxidized or nitrided.

By such high-density plasma treatment, an insulating film with a thickness of 1 to 20 nm, typically 5 to 10 nm, is formed on a semiconductor film. Since the reaction in this case is a solid-phase reaction, the interface state density between the insulating film and the semiconductor film can be quite low. Since such high-density plasma treatment directly oxidizes (or nitrides) a semiconductor film (crystalline silicon or polycrystalline silicon), desirably, an insulating film can be formed with extremely little unevenness. In addition, since crystal grain boundaries of crystalline silicon are not strongly oxidized, an excellent state is obtained. That is, by the solid-phase oxidation of a surface of a semiconductor film by high-density plasma treatment which is described in this embodiment, an insulating film with a uniform thickness and low interface state density can be formed without excessive oxidation reaction at the crystal grain boundaries.

As the gate insulating film 1906, only an insulating film formed by high-density plasma treatment may be used, or a stacked layer may be employed, which is obtained by deposition of an insulating film such as silicon oxide, silicon oxynitride, or silicon nitride on the insulating film, by a CVD method using plasma or thermal reaction. In either case, a transistor which includes such an insulating film formed by high-density plasma treatment in a part or the whole of its gate insulating film can have reduced characteristic variations.

In addition, the semiconductor films 1905a to 1905f, which are obtained by irradiation of a semiconductor film with a continuous wave laser beam or a laser beam oscillated with a repetition rate of 10 MHz or more and scanning the semiconductor film with the laser beam in one direction to crystallize the semiconductor film, have a characteristic in that their crystals grow in the beam scanning direction. Transistors are each arranged so that its channel length direction (direction in which carriers move when a channel formation region is formed) is aligned with the scanning direction, and the above-described gate insulating film is combined with the semiconductor film, whereby thin film transistors (TFTs: Thin Film Transistors) with high field effect mobility and reduced variations in characteristics can be obtained.

Next, a first conductive film and a second conductive film are stacked over the gate insulating film 1906. Here, the first conductive film is formed with a thickness of 20 to 100 nm by a CVD method, a sputtering method, or the like. The second conductive film is formed with a thickness of 100 to 400 nm. The first conductive film and the second conductive film are formed of an element selected from tantalum (Ta), tungsten (W), titanium (Ti), molybdenum (Mo), aluminum (Al), copper (Cu), chromium (Cr), niobium (Nb), and the like, or an alloy material or a compound material containing such an element as its main component. Alternatively, a semiconductor material typified by polycrystalline silicon doped with an impurity element such as phosphorus is used. Examples of combination of the first conductive film and the second conductive film are as follows: a tantalum nitride film and a tungsten film, a tungsten nitride film and a tungsten film, a molybdenum nitride film and a molybdenum film, and the like. Tungsten and tantalum nitride have high heat resistance. Therefore, after forming the first conductive film and the second conductive film, heat treatment for the purpose of thermal activation can be applied thereto. In addition, in the case where a two-layer structure is not employed, but a three-layer structure is employed, it is preferable to use a stacked structure of a molybdenum film, an aluminum film, and a molybdenum film.

Next, a resist mask is formed by photolithography, and etching treatment is conducted to form gate electrodes and gate lines. Thus, gate electrodes 1907 are formed above the semiconductor films 1905a to 1905f. Here, a stacked structure of a first conductive film 1907a and a second conductive film 1907b is shown as an example of the gate electrode 1907.

Next, as shown in FIG. 14C, the semiconductor films 1905a to 1905f are doped with an n-type impurity element at low concentration, using the gate electrodes 1907 as masks by an ion doping method or an ion implantation method. Then, a resist mask is selectively formed by photolithography, and the semiconductor films 1905c and 1905e are doped with a p-type impurity element at high concentration. As an n-type impurity element, phosphorus (P), arsenic (As), or the like can be used. As a p-type impurity element, boron (B), aluminum (Al), gallium (Ga), or the like can be used. Here, phosphorus (P) is used as an n-type impurity element and is selectively introduced into the semiconductor films 1905a to 1905f so as to be contained at concentrations of $1\times10^{15}$ to $1\times10^{19}$/ cm$^3$. Thus, n-type impurity regions 1908 are formed. In addition, boron (B) is used as a p-type impurity element, and is selectively introduced into the semiconductor films 1905c and 1905e so as to be contained at concentrations of $1\times10^{19}$ to $1\times10^{20}$/cm$^3$. Thus, p-type impurity regions 1909 are formed.

Subsequently, an insulating film is formed so as to cover the gate insulating film 1906 and the gate electrodes 1907. The insulating film is formed using either a single layer or a stacked layer of a film containing an inorganic material such as silicon, silicon oxide, or silicon nitride, or a film containing an organic material such as an organic resin by a plasma CVD method, a sputtering method, or the like. Next, the insulating film is selectively etched by anisotropic etching mainly in the perpendicular direction, so that insulating films 1910 (also referred to as sidewalls) which are in contact with the side surfaces of the gate electrodes 1907 are formed. The insulating films 1910 are used as masks in doping for forming LDD (Lightly Doped Drain) regions.

Next, the semiconductor films 1905a, 1905b, 1905d, and 1905f are doped with an n-type impurity element at high concentration, using resist masks formed by photolithography, the gate electrodes 1907, and the insulating films 1910 as masks. Thus, n-type impurity regions 1911 are formed. Here, phosphorus (P) is used as an n-type impurity element, and is selectively introduced into the semiconductor films 1905a, 1905b, 1905d, and 1905f so as to be contained at concentrations of $1\times10^{19}$ to $1\times10^{20}$/cm$^3$. Thus, the n-type impurity regions 1911 with higher concentration of impurity than that of the impurity regions 1908 are formed.

Through the above steps, as shown in FIG. 14D, n-channel thin film transistors 1900a, 1900b, 1900d, and 1900f, and p-channel thin film transistors 1900c and 1900e are formed.

In the n-channel thin film transistor 1900a, a channel formation region is formed in a region of the semiconductor film 1905a which overlaps with the gate electrode 1907; the impurity regions 1911 serving as source and drain regions are formed in regions of the semiconductor film 1905a which do not overlap with the gate electrode 1907 and the insulating film 1910; and low concentration impurity regions (LDD regions) are formed in regions of the semiconductor film 1905a which overlap with the insulating film 1910, between the channel formation region and the impurity regions 1911. Similarly, channel formation regions, low concentration impurity regions, and the impurity regions 1911 are formed in the n-channel thin film transistors 1900b, 1900d, and 1900f.

In the p-channel thin film transistor 1900c, a channel formation region is formed in a region of the semiconductor film 1905c which overlaps with the gate electrode 1907, and the impurity regions 1909 serving as source and drain regions are formed in regions of the semiconductor film 1905c which do not overlap with the gate electrode 1907. Similarly, a channel formation region and the impurity regions 1909 are formed in the p-channel thin film transistor 1900e. Here, although LDD regions are not formed in the p-channel thin film transistors 1900c and 1900e, LDD regions may be provided in the p-channel thin film transistors or a structure without LDD regions may be applied to the n-channel thin film transistors.

Next, as shown in FIG. 15A, an insulating film with a single layer structure or a stacked layer structure is formed so as to cover the semiconductor films 1905a to 1905f, the gate electrodes 1907, and the like. Then, conductive films 1913 electrically connected to the impurity regions 1909 and 1911 which serve as the source and drain regions of the thin film transistors 1900a to 1900f are formed over the insulating film. The insulating film is formed with a single layer or a stacked layer, using an inorganic material such as silicon oxide or silicon nitride, an organic material such as polyimide, polya-mide, benzocyclobutene, acrylic, or epoxy, a siloxane material, or the like by a CVD method, a sputtering method, an SOG method, a droplet discharging method, a screen printing method, or the like. In this embodiment, the insulating film is formed to have a two-layer structure, and a silicon nitride oxide film is formed as a first insulating film 1912a and a silicon oxynitride film is formed as a second insulating film 1912b. In addition, the conductive films 1913 form the source and drain electrodes of the thin film transistors 1900a to 1900f.

Before the first and second insulating films 1912a and 1912b are formed or after one or both of the first and second insulating films 1912a and 1912b is/are formed, heat treatment is preferably conducted for recovery of the crystallinity of the semiconductor films, activation of the impurity element which has been added to the semiconductor films, or hydrogenation of the semiconductor films. As the heat treatment, thermal annealing, laser annealing, RTA, or the like may be applied.

The conductive films 1913 are formed with a single layer or a stacked layer of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the element as its main component by a CVD method, a sputtering method, or the like. An alloy material containing aluminum as its main component corresponds to, for example, a material which contains aluminum as its main component and also contains nickel, or a material which contains aluminum as its main component and also contains nickel and one or both of carbon and silicon. The conductive films 1913 are preferably formed to have a stacked structure of a barrier film, an aluminum silicon (Al—Si) film, and a barrier film or a stacked structure of a barrier film, an aluminum silicon (Al—Si) film, a titanium nitride film, and a barrier film. Note that the "barrier film" corresponds to a thin film formed of titanium, titanium nitride, molybdenum, or molybdenum nitride. Aluminum and aluminum silicon are suitable materials for forming the conductive films 1913 because they have low resistance and are inexpensive. When barrier layers are provided as the top layer and the bottom layer, generation of hillocks of aluminum or aluminum silicon can be prevented. In addition, when a barrier film is formed of titanium which is an element having a high reducing property, even if a thin natural oxide film is formed on the crystalline semiconductor film, the natural oxide film can be reduced, and a favorable contact between the conductive film 1913 and the crystalline semiconductor film can be obtained.

Next, an insulating film 1914 is formed so as to cover the conductive films 1913, and conductive films 1915a and 1915b electrically connected to the conductive films 1913 which form the source or drain electrodes of the thin film transistors 1900a and 1900f are formed over the insulating film 1914. In addition, conductive films 1916a and 1916b electrically connected to the conductive films 1913 which form the source or drain electrodes of the thin film transistors 1900b and 1900e are formed. Note that the conductive films 1915a and 1915b and the conductive films 1916a and 1916b may be formed using the same material at the same time. The conductive films 1915a and 1915b and the conductive films 1916a and 1916b can be formed using any of the above-described materials for the conductive films 1913.

Next, as shown in FIG. 15B, a conductive film 1917 functioning as an antenna is formed so as to be electrically connected to the conductive films 1916a and 1916b. Here, the conductive film 1917 functioning as an antenna corresponds to the antenna of the antenna circuit described in the above embodiment mode.

The insulating film 1914 can be formed with a single layer or a stacked layer of an insulating film containing oxygen and/or nitrogen such as silicon oxide ($SiO_x$), silicon nitride ($SiN_x$), silicon oxynitride ($SiO_xN_y$, where x>y>0), or silicon nitride oxide ($SiN_xO_y$, where x>y>0); a film containing carbon such as DLC (Diamond-Like Carbon); an organic material such as epoxy, polyimide, polyamide, polyvinyl phenol, benzocyclobutene, or acrylic; or a siloxane material such as a siloxane resin by a CVD method, a sputtering method, or the like. Note that a siloxane material corresponds to a material having a bond of Si—O—Si. Siloxane has a skeleton structure with the bond of silicon (Si) and oxygen (O). As a substituent of siloxane, an organic group containing at least hydrogen (e.g., an alkyl group or aromatic hydrocarbon) is used. Alternatively, a fluoro group may be used as the substituent. Further, both a fluoro group and an organic group containing at least hydrogen may be used as the substituent.

The conductive films 1917a and 1917b are formed of a conductive material by a CVD method, a sputtering method, a printing method such as screen printing or gravure printing, a droplet discharging method, a dispenser method, a plating method, or the like. The conductive films 1917a and 1917b are each formed with a single layer or a stacked layer of an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing such an element as its main component.

For example, when the conductive films 1917a and 1917b functioning as antennas are formed by a screen printing method, the conductive films 1917a and 1917b can be provided by selective printing of a conductive paste in which conductive particles with a grain diameter of several nanometers to several tens of micrometers are dissolved or dispersed in an organic resin. The conductive particles can be at least one or more of metal particles selected from silver (Ag), gold (Au), copper (Cu), nickel (Ni), platinum (Pt), palladium (Pd), tantalum (Ta), molybdenum (Mo), titanium (Ti), and the like; fine particles of silver halide; and dispersive nanoparticles thereof. In addition, the organic resin included in the conductive paste can be one or more of organic resins which function as a binder, a solvent, a dispersing agent, and a coating material of the metal particles. Typically, organic resins such as an epoxy resin and a silicone resin can be given as examples. Preferably, a conductive paste is extruded and then baked to form the conductive films. For example, in the case of using fine particles (e.g., a grain diameter of 1 to 100 nm) containing silver as its main component as a material of the conductive paste, the conductive paste is baked and hardened at temperatures of 150 to 300° C., so that the conductive films can be obtained. Alternatively, it is also possible to use fine particles containing solder or lead-free solder as its main component. In that case, fine particles with a grain diameter of 20 μm or less are preferably used. Solder and lead-free solder have the advantage of low cost and the like.

Next, as shown in FIG. 15C, after forming an insulating film 1918 so as to cover the conductive films 1917a and 1917b, a layer including the thin film transistors 1900a to 1900f, the conductive films 1917a and 1917b, and the like (hereinafter referred to as an "element formation layer 1919") is peeled off the substrate 1901. Here, after forming opening portions in the element formation layer 1919 excluding the regions of the thin film transistors 1900a to 1900f by laser irradiation (e.g., with UV light irradiation), the element formation layer 1919 can be peeled off the substrate 1901 with a physical force. The peeling layer 1903 may be selectively removed by introduction of an etchant into the opening portions before peeling the element formation layer 1919 off the substrate 1901. As the etchant, a gas or a liquid containing halogen fluoride or halide is used. For example, when chlorine trifluoride ($ClF_3$) is used as the gas containing halogen fluoride, the element formation layer 1919 is peeled off the substrate 1901. The whole peeling layer 1903 does not necessarily be removed but part thereof may be left. Accordingly, the consumption of the etchant can be suppressed and process time needed for removing the peeling layer can be shortened. In addition, even after removing the peeling layer 1903, the element formation layer 1919 can be held above the substrate 1901. In addition, by reuse of the substrate 1901 from which the element formation layer 1919 has been peeled, cost reduction can be achieved.

The insulating film 1918 can be formed with a single layer or a stacked layer of an insulating film containing oxygen and/or nitrogen such as silicon oxide ($SiO_x$), silicon nitride ($SiN_x$), silicon oxynitride ($SiO_xN_y$, where x>y>0), or silicon nitride oxide ($SiN_xO_y$, where x>y>0); a film containing carbon such as DLC (Diamond-Like Carbon); an organic material such as epoxy, polyimide, polyamide, polyvinyl phenol, benzocyclobutene, or acrylic; or a siloxane material such as a siloxane resin by a CVD method, a sputtering method, or the like.

In this embodiment, as shown in FIG. 16A, after forming the opening portions in the element formation layer 1919 by laser irradiation, a first sheet material 1920 is attached to one surface of the element formation layer 1919 (the surface where the insulating film 1918 is exposed), and then the element formation layer 1919 is peeled off the substrate 1901.

Next, as shown in FIG. 16B, a second sheet material 1921 is attached to the other surface of the element formation layer 1919 (the surface exposed by peeling), followed by one or both of heat treatment and pressurization treatment for attachment of the second sheet material 1921. The first sheet material 1920 and the second sheet material 1921 may be a hot-melt film or the like.

As the first sheet material 1920 and the second sheet material 1921, a film on which antistatic treatment for preventing static electricity or the like has been applied (hereinafter referred to as an antistatic film) can also be used. As examples of the antistatic film, a film in which an antistatic material is dispersed in a resin, a film to which an antistatic material is attached, and the like can be given. The film provided with an antistatic material can be a film with an antistatic material provided on one of its surfaces, or a film with an antistatic material provided on each of its surfaces. The film with an antistatic material provided on one of its surfaces may be attached to the layer so that the antistatic material is placed on the inner side of the film or the outer side of the film. The antistatic material may be provided over the entire surface of the film or over a part of the film. As an antistatic material, a metal, indium tin oxide (ITO), or a surfactant such as an amphoteric surfactant, a cationic surfactant, or a nonionic surfactant can be used. Further, as an antistatic material, a resin material which contains a cross-linked copolymer having a carboxyl group and a quaternary ammonium base on its side chain, or the like can be used. Such a material is attached, mixed, or applied to a film, so that an antistatic film can be formed. The element formation layer is sealed using the antistatic film, so that the semiconductor elements can be protected from adverse effects such as external static electricity when dealt with as a commercial product.

Although the case where the element formation layer 1919 is peeled off the substrate 1901 for use is described in this embodiment, the element formation layer 1919 may be formed over the substrate 1901 without the peeling layer 1903 provided and may be used as a semiconductor device. Note that, when the substrate 1901 is an SOI (silicon on insulator) substrate, the semiconductor film may be a single crystalline semiconductor film, and the time needed for the step of crystallizing a semiconductor film can be eliminated.

As described above, the semiconductor device which is manufactured by the method for manufacturing the semiconductor device of the present invention described in this embodiment has the features of flexibility in physical shape and light weight. In particular, since the semiconductor device of the present invention does not require a battery, it can have higher flexibility in physical shape.

Embodiment 6

In this embodiment, an example of manufacturing the semiconductor device of the present invention using transistors which are formed over a single crystalline substrate is described. Because variations in characteristics of the transistors formed over a single crystalline substrate can be suppressed, the number of transistors to be used in the semiconductor device can be reduced.

First, as shown in FIG. 18A, element separating insulating films 2301 for electrically separating semiconductor elements are formed of insulating films on a semiconductor substrate 2300. By formation of the element separating insulating films 2301, a region in which a transistor is to be formed (element formation region) 2302 and an element formation region 2303 can be electrically separated from each other.

The semiconductor substrate 2300 may be, for example, a single crystalline silicon substrate having n-type or p-type conductivity, a compound semiconductor substrate (e.g., a GaAs substrate, an InP substrate, a GaN substrate, a SiC substrate, a sapphire substrate, or a ZnSe substrate), an SOI (silicon on insulator) substrate formed by a bonding method or a SIMOX (separation by implanted oxygen) method, or the like.

The element separating insulating films 2301 can be formed by a selective oxidation method (a LOCOS (local oxidation of silicon) method), a trench isolation method, or the like.

In this embodiment, an example in which a single crystalline silicon substrate having n-type conductivity is used as the semiconductor substrate 2300 and a p well 2304 is formed in the element formation region 2303 is described. The p well 2304 formed in the element formation region 2303 of the semiconductor substrate 2300 can be formed by selectively introducing a p-type impurity element into the element formation region 2303. As a p-type impurity element, boron (B), aluminum (Al), gallium (Ga), or the like can be used. Alternatively, when the semiconductor substrate 2300 is a p-type semiconductor substrate, an n well may be formed by selectively introducing an n-type impurity element into the element formation region 2302.

In this embodiment, since the semiconductor substrate 2300 is an n-type semiconductor substrate, an impurity element is not introduced into the element formation region 2302. However, an n well may be formed in the element formation region 2302 by introducing an n-type impurity element. As an n-type impurity element, phosphorus (P), arsenic (As), or the like can be used.

Next, as shown in FIG. 18B, insulating films 2305 and 2306 are formed to cover the element formation regions 2302 and 2303, respectively. In this embodiment, silicon oxide films formed in the element formation regions 2302 and 2303 by thermal oxidation of the semiconductor substrate 2300 are used as the insulating films 2305 and 2306. Alternatively, after silicon oxide films are formed by thermal oxidation, silicon oxynitride films may be formed by nitridation of surfaces of the silicon oxide films, and stacked layers of the silicon oxide films and the silicon oxynitride films may be used as the insulating films 2305 and 2306.

Still alternatively, the insulating films 2305 and 2306 may be formed by plasma treatment as described above. For example, silicon oxide ($SiO_x$) films or silicon nitride ($SiN_x$) films can be formed as the insulating films 2305 and 2306 in the element formation regions 2302 and 2303 by application of high-density plasma oxidation or high-density plasma nitridation treatment to the surface of the semiconductor substrate 2300.

Next, as shown in FIG. 18C, a conductive film is formed to cover the insulating films 2305 and 2306. In this embodiment, an example of using a conductive film 2307 and a conductive film 2308 which are sequentially stacked as the conductive film is described. The conductive film may be a single-layer conductive film or a stacked layer of three or more conductive films.

The conductive films 2307 and 2308 can be formed of tantalum (Ta), tungsten (W), titanium (Ti), molybdenum (Mo), aluminum (Al), copper (Cu), chromium (Cr), niobium (Nb), or the like. Alternatively, the conductive films 2307 and 2308 may each be a film formed of an alloy containing the above metal as its main component, or a film formed of a compound containing the above metal as well as a film formed of the above metal. Alternatively, it may be formed using a semiconductor such as polycrystal silicon doped with an impurity element such as phosphorus which imparts conductivity to a semiconductor film. In this embodiment, the conductive film 2307 is formed using tantalum nitride, and the conductive film 2308 is formed using tungsten.

Next, as shown in FIG. 19A, the stacked conductive films 2307 and 2308 are processed (patterned) into a predetermined shape to form gate electrodes 2309 and 2310 over the insulating films 2305 and 2306, respectively.

Next, as shown in FIG. 19B, a mask 2311 is selectively formed of a resist to cover the element formation region 2302. Then, an impurity element is introduced into the element formation region 2303. Since the gate electrode 2310 as well as the mask 2311 functions as a mask, impurity regions 2312 serving as a source region and a drain region and a channel formation region 2313 are formed in the p well 2304 by introduction of the above impurity element. As the impurity element, an n-type impurity element or a p-type impurity element is used. As the n-type impurity element, phosphorus (P), arsenic (As), or the like can be used. As the p-type impurity element, boron (B), aluminum (Al), gallium (Ga), or the like can be used. In this embodiment, phosphorus (P) is used as the impurity element.

Next, the mask 2311 is removed and then a mask 2314 is selectively formed of a resist to cover the element formation region 2303 as shown in FIG. 19C. Then, an impurity element is introduced into the element formation region 2302. Since the gate electrode 2309 as well as the mask 2314 functions as a mask, impurity regions 2315 serving as a source region and a drain region and a channel formation region 2316 are formed in the element formation region 2302 of the semiconductor substrate 2300. As an impurity element, an n-type impurity element or a p-type impurity element is used. As the n-type impurity element, phosphorus (P), arsenic (As), or the like can be used. As the p-type impurity element, boron (B), aluminum (Al), gallium (Ga), or the like can be used. In this embodiment, an impurity element (e.g., boron (B)) which has a different conductivity type from the impurity element introduced into the element formation region 2303 in FIG. 19C is introduced.

Next, as shown in FIG. 20A, an insulating film 2317 is formed to cover the insulating films 2305 and 2306 and the gate electrodes 2309 and 2310. Then, contact holes are formed in the insulating film 2317 to expose part of the impurity regions 2312 and 2315. Next, conductive films 2318 are formed to be connected to the impurity regions 2312 and 2315 through the contact holes. The conductive films 2318 can be formed by a CVD method, a sputtering method, or the like.

The insulating film 2317 can be formed using an inorganic insulating film, an organic resin film, or a siloxane-based insulating film. The inorganic insulating film may be a silicon oxide film, a silicon oxynitride film, a silicon nitride oxide film, or a carbon-containing film typified by a diamond-like carbon (DLC) film, or the like. The organic resin film may be formed using, for example, acrylic, epoxy, polyimide, polyamide, polyvinylphenol, benzocyclobutene, or the like. The insulating film 2317 can be formed by a CVD method, a sputtering method, a droplet discharge method, a printing method, or the like in accordance with its material.

A structure of a transistor used in the semiconductor device of the present invention is not limited to the structure shown in this embodiment. For example, an inverted staggered structure may be employed.

Next, as shown in FIG. 20B, an interlayer film 2324 is formed. Then, the interlayer film 2324 is etched to form a contact hole, so that part of the conductive film 2318 is exposed. The interlayer film 2324 is not limited to a resin film and may be another film such as an oxide film formed by CVD. However, a resin film is preferable in terms of planarity. Alternatively, a photosensitive resin may be used, so that a contact hole may be formed without etching. Next, a wiring 2325 is formed over the interlayer film 2324 to be in contact with the conductive film 2318 through a contact hole.

Next, a conductive film 2326 serving as an antenna is formed to be in contact with the wiring 2325. The conductive film 2326 can be formed using a metal such as silver (Ag), gold (Au), copper (Cu), palladium (Pd), chromium (Cr), platinum (Pt), titanium (Ti), tantalum (Ta), tungsten (W), aluminum (Al), iron (Fe), cobalt (Co), zinc (Zn), tin (Sn), or nickel (Ni). The conductive film 2326 may be formed using a film which is formed of an alloy containing the above metal as its main component or a film which is formed of a compound containing the above element as well as a film formed of the above metal. The conductive film 2326 may be a single layer of the above film or a stack of a plurality of the films.

The conductive film 2326 can be formed by a CVD method, a sputtering method, a printing method such as screen printing or gravure printing, a droplet discharge method, a dispenser method, a plating method, a photolithography method, an evaporation method, or the like.

Although the example in which the antenna and the semiconductor element are formed over the same substrate is described in this embodiment, the present invention is not limited to this structure. After the semiconductor element is formed, a separately-formed antenna may be electrically connected to an integrated circuit. In this case, an electrical connection between the antenna and the integrated circuit can be performed by pressure bonding with an anisotropic conductive film (ACF), an anisotropic conductive paste (ACP), or the like. Alternatively, a connection can be performed using a conductive adhesive such as a silver paste, a copper paste, or a carbon paste; solder joint; or the like.

As described above in this embodiment, because the semiconductor device which is manufactured by the method for manufacturing the semiconductor device of the present invention does not require a battery, a lightweight semiconductor device can be provided at low cost. Note that this embodiment can be freely combined with any of the aforementioned embodiment mode and embodiments.

Embodiment 7

Figure 17:
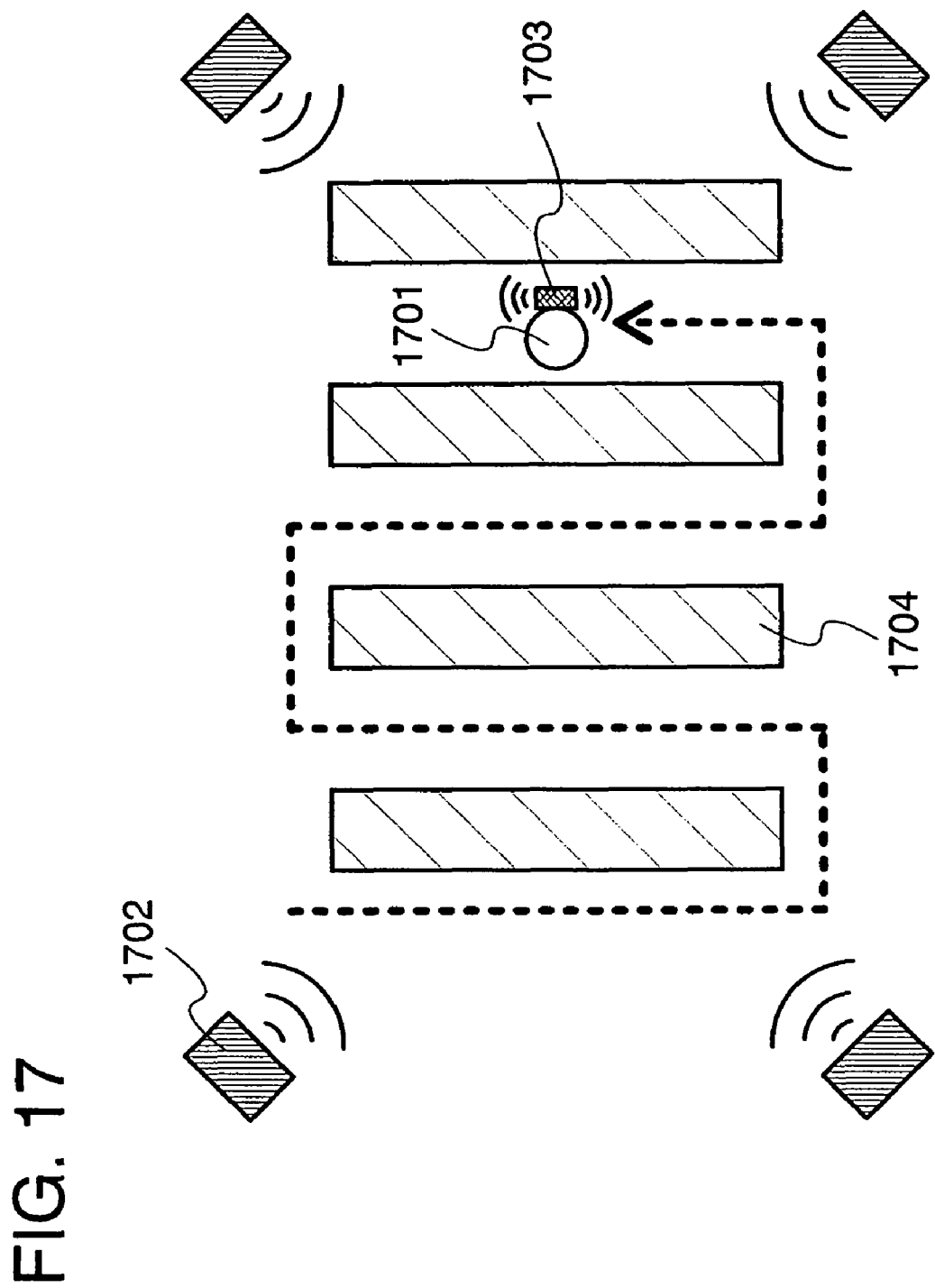
FIG. 17 is a diagram illustrating a positional information detection system using a semiconductor device of the present invention.

In this embodiment, a product management system and a management system of a moving object in a room or the like are described as examples of using the semiconductor device of the present invention with reference to FIG. 17. With the semiconductor device of the present invention, the positional information of furniture having the semiconductor device can be known by calculation of the distance between a plurality of readers/writers and the semiconductor device.

First, a case where a customer purchases a product in a store is described with reference to FIG. 17. Each product displayed in the store has the semiconductor device of the invention as well as IC label or an IC tag which stores information such as product-specific information or production history.

A customer 1701 holding a product 1703 that has the semiconductor device of the present invention moves in the store surrounded by readers/writers 1702 which are placed in the store for position detection. As described above in the embodiment mode, a manager can know a flow line of the customer 1701 moving around display cabinets 1704 by detection of the position of the semiconductor device by the reader/writers 1702 provided in the store. It is preferable to record and manage the flow lines of customers because marketing such as the location for providing products and product management can be performed efficiently.

As described in this embodiment, a flow line of the product in the store is known in real time by using a plurality of reader/writers provided in the store, so that theft can be prevented without the customer going through a gate of a reader/writer that is provided to prevent theft from the display cabinets. Further, since the flow line of the product can be known in real time, the manager can forecast information on movement of a thief in advance with the use of a computer or the like, take measures such as blocking the passage, and prevent theft of the product from occurring. Accordingly, the manager can capture the thief without directly catching the thief, and thus the thief can be easily caught.

In this embodiment, the manager can manage positional information of products in real time without providing a gate-shaped reader/writer at a doorway and without customers noticing a reader/writer, if the reader/writer is provided in a part of floor tiles, a part of pillars, a ceiling, or the like. A position detection system using the semiconductor device of the present invention makes it easier to trace a flow line of the product in a small area, which is difficult for a GPS or the like. Further, the semiconductor device of the present invention can cover a range of several meters when an antenna for the UHF band is used. Further, it is preferable that the semiconductor device of the present invention has an anti-collision function because a plurality of moving bodies can also be managed.

Note that the position detection system using the semiconductor device of the present invention is effective in preventing theft by use together with a surveillance camera or the like. The manager can perform management from a remote place more certainly and easily.

In addition, it is preferable to use a larger number of readers/writers in this embodiment because an accurate flow line of an object having the semiconductor device can be observed easily even in a large space. By applying the semiconductor device of the present invention to this embodiment, the semiconductor device of the present invention can have a function to detect a physical location without having a battery therein. Since the semiconductor device of the present invention does not require a battery, a lightweight semiconductor device having flexibility in physical shape can accordingly be provided at low cost. Thus, the semiconductor device has the advantage of easy attachment to a product.

This application is based on Japanese Patent Application serial No. 2007-000858 filed with Japan Patent Office on Jan. 6, 2007, the entire contents of which are hereby incorporated by reference.

What is claimed is:

1. A semiconductor device comprising:
an antenna circuit configured to transmit and receive a wireless signal;
an analog-to-digital converter circuit; and
a power supply circuit comprising a rectifier circuit, and configured to:
generate an input voltage based on the wireless signal received by the antenna circuit and rectified by the rectifier circuit, and input the input voltage in the analog-to-digital converter circuit, and
generate a reference voltage from the wireless signal and input the reference voltage in the analog-to-digital converter circuit,
wherein the analog-to-digital converter circuit is configured to convert a signal strength of the input voltage from an analog value to a digital value.

2. A semiconductor device comprising:
an antenna circuit configured to transmit and receive a wireless signal;
an analog-to-digital converter circuit; and
a power supply circuit comprising a rectifier circuit, and configured to:
generate an input voltage based on the wireless signal received by the antenna circuit and rectified by the rectifier circuit, and input the input voltage in the analog-to-digital converter circuit, and
generate a reference voltage from the wireless signal and input the reference voltage in the analog-to-digital converter circuit,
wherein the analog-to-digital converter circuit is configured to convert a signal strength of the input voltage from an analog value to a digital value; and
wherein a data signal with the digital value is emitted by the antenna circuit.

3. A semiconductor device comprising:
an antenna circuit configured to transmit and receive a wireless signal;
a logic circuit;
a power supply circuit configured to:
supply a power voltage generated from the wireless signal to the logic circuit, and
generate an input voltage based on the wireless signal received by the antenna circuit; and
at least two analog-to-digital converter circuits comprised in the logic circuit and configured to convert a signal strength of the input voltage from an analog value to a digital value.

4. The semiconductor device according to claim 1, wherein the analog-to-digital converter circuit is a flash analog-to-digital converter circuit.

5. The semiconductor device according to claim 1, wherein the analog-to-digital converter circuit is a successive approximation analog-to-digital converter circuit.

6. The semiconductor device according to claim 1, wherein the analog-to-digital converter circuit is a multi-slope analog-to-digital converter circuit.

7. The semiconductor device according to claim 1, wherein the analog-to-digital converter circuit is a $\Sigma\Delta$ analog-to-digital converter circuit.

8. The semiconductor device according to claim 1, wherein each of the power supply circuit and the analog-to-digital converter circuit is formed using a transistor.

9. The semiconductor device according to claim 2, wherein the analog-to-digital converter circuit is a flash analog-to-digital converter circuit.

10. The semiconductor device according to claim 2, wherein the analog-to-digital converter circuit is a successive approximation analog-to-digital converter circuit.

11. The semiconductor device according to claim 2, wherein the analog-to-digital converter circuit is a multi-slope analog-to-digital converter circuit.

12. The semiconductor device according to claim 2, wherein the analog-to-digital converter circuit is a $\Sigma\Delta$ analog-to-digital converter circuit.

13. The semiconductor device according to claim 2, wherein each of the power supply circuit and the analog-to-digital converter circuit is formed using a transistor.

14. The semiconductor device according to claim 3, wherein at least one of the analog-to-digital converter circuits is a flash analog-to-digital converter circuit.

15. The semiconductor device according to claim 3, wherein at least one of the analog-to-digital converter circuits is a successive approximation analog-to-digital converter circuit.

16. The semiconductor device according to claim 3, wherein at least one of the analog-to-digital converter circuits is a multi-slope analog-to-digital converter circuit.

17. The semiconductor device according to claim 3, wherein at least one of the analog-to-digital converter circuits is a $\Sigma\Delta$ analog-to-digital converter circuit.

18. The semiconductor device according to claim 3, wherein each of the power supply circuit and the analog-to-digital converter circuits is formed using a transistor.

19. The semiconductor device according to claim 3, wherein the two analog-to-digital converter circuits comprise any two analog-to-digital converter circuits selected from the group consisting of a flash analog-to-digital converter circuit, a successive approximation analog-to-digital converter circuit, a multi-slope analog-to-digital converter circuit, and a $\Sigma\Delta$ analog-to-digital converter circuit.

20. The semiconductor device according to claim 3, further being configured to select which of the at least two analog-to-digital converter circuits is used to convert the signal strength of the input voltage from the analog value to the digital value in accordance with the signal strength.

21. The semiconductor device according to claim 1,
further comprising a logic circuit comprising the analog-to-digital converter circuit,
wherein the power supply circuit is further configured to supply a power voltage generated from the wireless signal to the logic circuit.

22. The semiconductor device according to claim 2,
further comprising a logic circuit comprising the analog-to-digital converter circuit,
wherein the power supply circuit is further configured to a supply power voltage generated from the wireless signal to the logic circuit.

* * * * *